United States Patent
Schaefer

(10) Patent No.: US 9,448,862 B1
(45) Date of Patent: *Sep. 20, 2016

(54) LISTENING FOR EXTERNALLY INITIATED REQUESTS

(71) Applicant: CA, Inc., Islandia, NY (US)

(72) Inventor: Bruce A. Schaefer, Tyler, TX (US)

(73) Assignee: CA, Inc., Islandia, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 13/933,648

(22) Filed: Jul. 2, 2013

Related U.S. Application Data

(60) Provisional application No. 61/824,044, filed on May 16, 2013.

(51) Int. Cl.
 *G06F 3/00* (2006.01)
 *G06F 9/54* (2006.01)

(52) U.S. Cl.
 CPC .................................... *G06F 9/546* (2013.01)

(58) Field of Classification Search
 CPC ........................................................ G06F 9/54
 USPC ................................................ 719/310, 328
 See application file for complete search history.

(56) References Cited

U.S. PATENT DOCUMENTS

| | | | |
|---|---|---|---|
| 5,167,035 A | | 11/1992 | Mann et al. |
| 5,329,619 A | * | 7/1994 | Page et al. ............ 709/203 |
| 5,403,639 A | * | 4/1995 | Belsan et al. |
| 5,712,974 A | * | 1/1998 | Gainey et al. ......... 709/227 |
| 5,974,049 A | | 10/1999 | Ratcliff et al. |
| 6,031,978 A | | 2/2000 | Cotner et al. |
| 6,301,643 B1 | | 10/2001 | Crockett et al. |
| 6,336,171 B1 | | 1/2002 | Coskrey, IV |
| 6,351,775 B1 | | 2/2002 | Yu |
| 6,529,995 B1 | | 3/2003 | Shepherd |
| 7,055,153 B2 | * | 5/2006 | Beck et al. ............ 719/315 |
| 7,089,294 B1 | | 8/2006 | Baskey et al. |
| 7,406,596 B2 | | 7/2008 | Tararoukhine et al. |
| 7,562,143 B2 | | 7/2009 | Fellenstein et al. |
| 7,698,439 B2 | | 4/2010 | Zuberi |
| 7,979,554 B2 | | 7/2011 | Ho et al. |
| 8,799,641 B1 | | 8/2014 | Seidenberg et al. |

(Continued)

OTHER PUBLICATIONS

Jeffrey M. Nick, Overview of IBM System/390 Parallel Sysplex—A Commercial Parallel Processing system, 1996.*

(Continued)

*Primary Examiner* — Lechi Truong
(74) *Attorney, Agent, or Firm* — Stevens & Showalter, LLP

(57) ABSTRACT

Processing a request from a sending computer that is a co-member of a message group of a sysplex coupled together using a signaling service includes determining, by a receiving computer, that a signaling service message has been received from the sending computer, wherein the signaling service message relates to a data transfer between the sending computer and the receiving computer and wherein the data transfer relates to an exchange of one or more files between the sending and receiving computers using a communications channel other than the signaling service. This processing also includes decoding, by the receiving computer, the signaling service message to determine contents of the signaling service message related to the data transfer; and performing, by the receiving computer, an action related to the data transfer based on the contents of the signaling service message.

28 Claims, 28 Drawing Sheets

(56) References Cited

U.S. PATENT DOCUMENTS

| | | | |
|---|---|---|---|
| 2001/0011298 A1* | 8/2001 | Gosling et al. | 709/203 |
| 2002/0087548 A1* | 7/2002 | Tasalloti | 707/10 |
| 2002/0143953 A1 | 10/2002 | Aiken, Jr. | |
| 2002/0143954 A1* | 10/2002 | Aiken et al. | 709/227 |
| 2003/0023767 A1 | 1/2003 | Brabson et al. | |
| 2003/0046343 A1 | 3/2003 | Krishnamurthy et al. | |
| 2003/0163560 A1 | 8/2003 | Allen et al. | |
| 2003/0191918 A1 | 10/2003 | Flaherty et al. | |
| 2004/0019643 A1 | 1/2004 | Zirnstein, Jr. | |
| 2004/0024861 A1* | 2/2004 | Coughlin | 709/224 |
| 2005/0050148 A1 | 3/2005 | Mohammadioun et al. | |
| 2005/0068899 A1 | 3/2005 | Murphy et al. | |
| 2006/0059230 A1 | 3/2006 | Dykas et al. | |
| 2006/0059253 A1 | 3/2006 | Goodman et al. | |
| 2006/0106938 A1 | 5/2006 | Dini et al. | |
| 2007/0030813 A1 | 2/2007 | Arrowood et al. | |
| 2007/0169017 A1 | 7/2007 | Coward | |
| 2009/0055689 A1 | 2/2009 | Petersen | |
| 2010/0106778 A1 | 4/2010 | Needham et al. | |
| 2011/0099236 A1 | 4/2011 | Vuong et al. | |
| 2011/0137790 A1 | 6/2011 | Hou | |
| 2013/0097328 A1 | 4/2013 | Wookey | |
| 2013/0263146 A1 | 10/2013 | Turk | |
| 2014/0032491 A1 | 1/2014 | Neerincx et al. | |
| 2014/0258256 A1 | 9/2014 | Dee et al. | |

OTHER PUBLICATIONS

CA XCOM Data Transport for z/OS; Overview Guide; r11.5; 2009; 60 pages.

Related U.S. Appl. No. 14/666,962; Entitled "Listening for Externally Initiated Requests," filed Mar. 24, 2015 by Bruce A. Schaefer.

Related U.S. Appl. No. 13/933,190; Entitled "Sysplex Signal Service Protocol Converter," filed Jul. 2, 2013 by Bruce A. Schaefer.

Related U.S. Appl. No. 13/933,239; Entitled "Ranking Candidate Servers," filed Jul. 2, 2013 by Bruce A. Schaefer.

Related U.S. Appl. No. 13/933,316; Entitled "Signaling Service Interface Module," filed Jul. 2, 2013 by Bruce A. Schaefer.

Related U.S. Appl. No. 13/933,431; Entitled "Communications Pacing," filed Jul. 2, 2013 by Bruce A. Schaefer.

Related U.S. Appl. No. 13/933,540; Entitled "Peer-To-Peer File Transfer Task Coordination," filed Jul. 2, 2013 by Bruce A. Schaefer.

Lechi, Truong; Final Office Action; U.S. Appl. No. 13/933,316; Jan. 23, 2015; United States Patent and Trademark Office; Alexandria, VA.

Lechi, Truong; Non-Final Office Action; U.S. Appl. No. 13/933,316; Sep. 29, 2014; United States Patent and Trademark Office; Alexandria, VA.

Truong, Lechi; Office Action; U.S. Appl. No. 14/666,962 ; Jun. 5, 2015; United States Patent and Trademark Office; Alexandria, VA.

Harrell, Robert B.; Office Action; U.S. Appl. No. 13/933,239 ; Jul. 2, 2015; United States Patent and Trademark Office; Alexandria, VA.

Truong, Lechi; Notice of Allowance; U.S. Appl. No. 13/933,316 ; dated Sep. 8, 2015; United States Patent and Trademark Office, Alexandria, VA.

Johnson; "The Importance of Systems Management for a Parallel Sysplex" ; 1997.

Harrell, Robert B.; Final Office Action; U.S. Appl. No. 13/933,239 ; Jan. 8, 2016; United States Patent and Trademark Office; Alexandria, Virginia.

Thieu, Benjamin M.; Office Action; U.S. Appl. No. 13/933,540 ; Jan. 14, 2016; United States Patent and Trademark Office; Alexandria, Virginia.

Thieu, Benjamin M.; Office Action; U.S. Appl. No. 13/933,190; Feb. 25, 2016; United States Patent and Trademark Office; Alexandria, VA.

Nick, Jeffrey M.; Overview of IBM System/390 Parallel Sysplex—A Commercial Parallel Processing System; 1996.

Joshua Joo; Office Action; U.S. Appl. No. 13/933,431; Oct. 30, 2015; United States Patent and Trademark Office; Alexandria, Virginia.

Truong, Lechi; Notice of Allowance; U.S. Appl. No. 14/666,962; Oct. 30, 2015; United States Patent and Trademark Office; Alexandria, Virginia.

Thieu, Benjamin M.; Final Office Action; U.S. Appl. No. 13/933,540; Jul. 27, 2016; United States Patent & Trademark Office, Alexandria, VA.

* cited by examiner

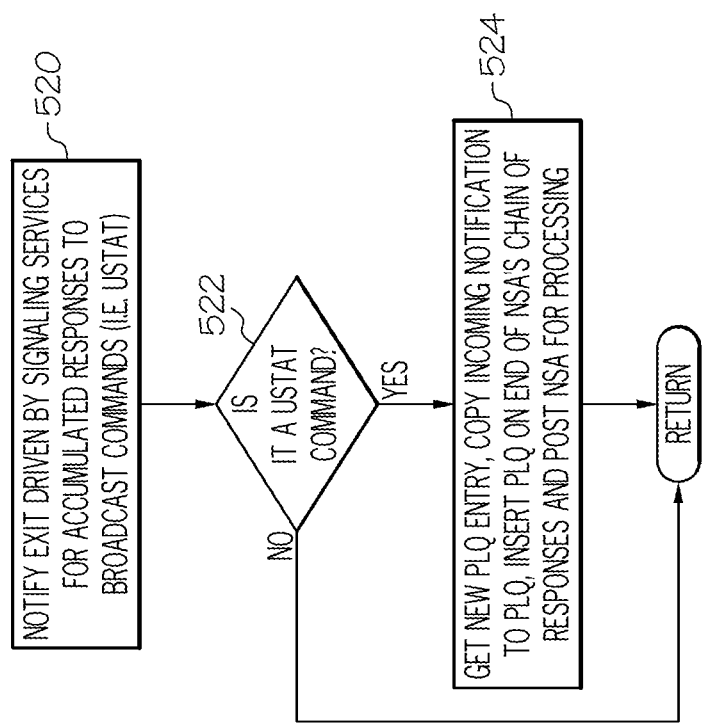

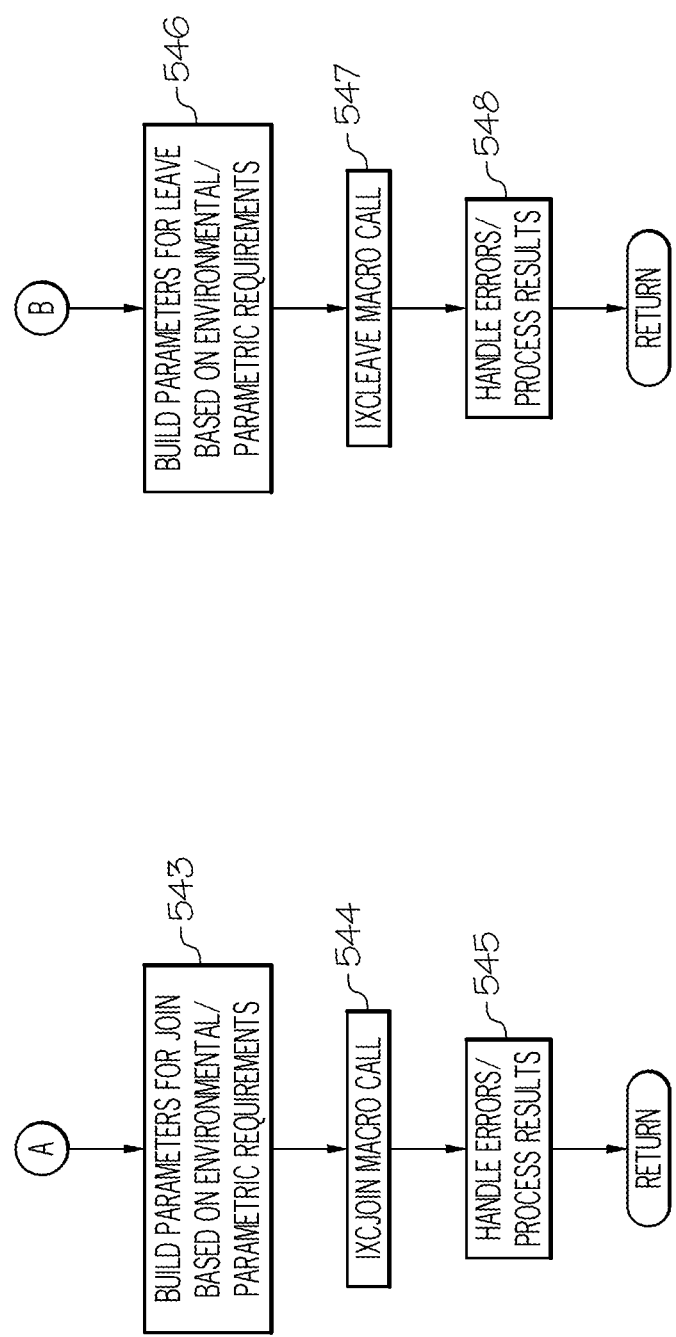

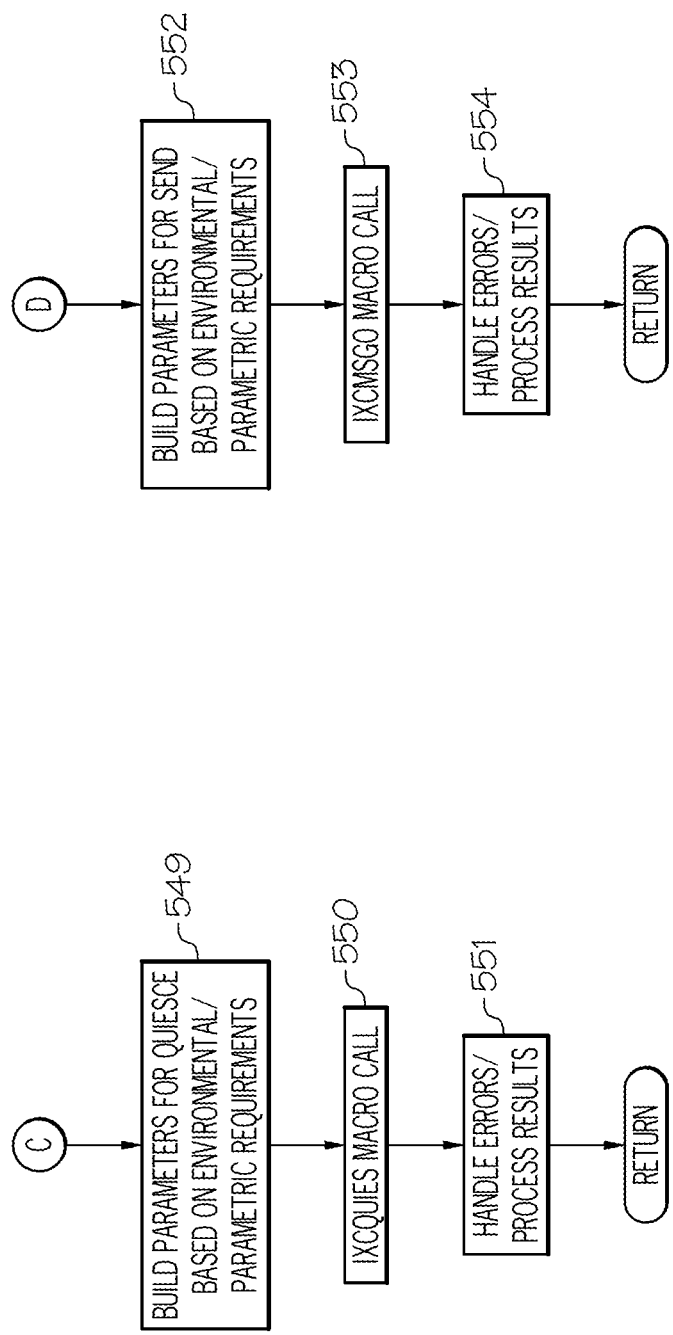

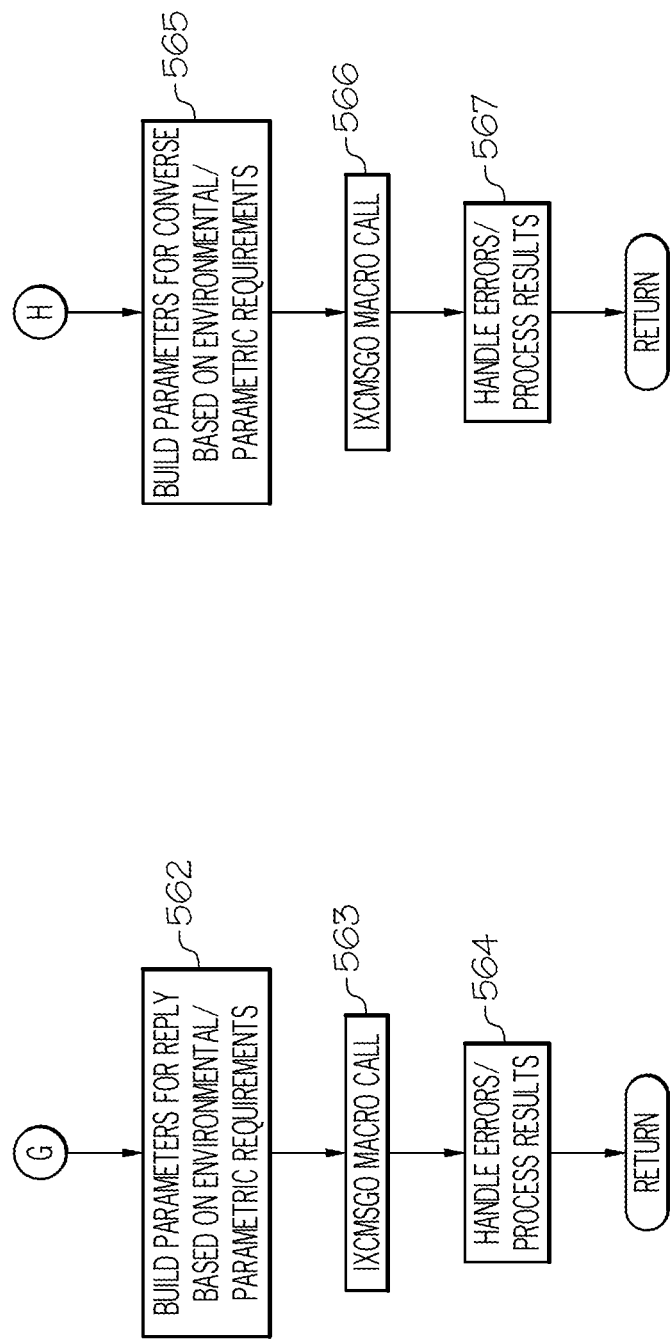

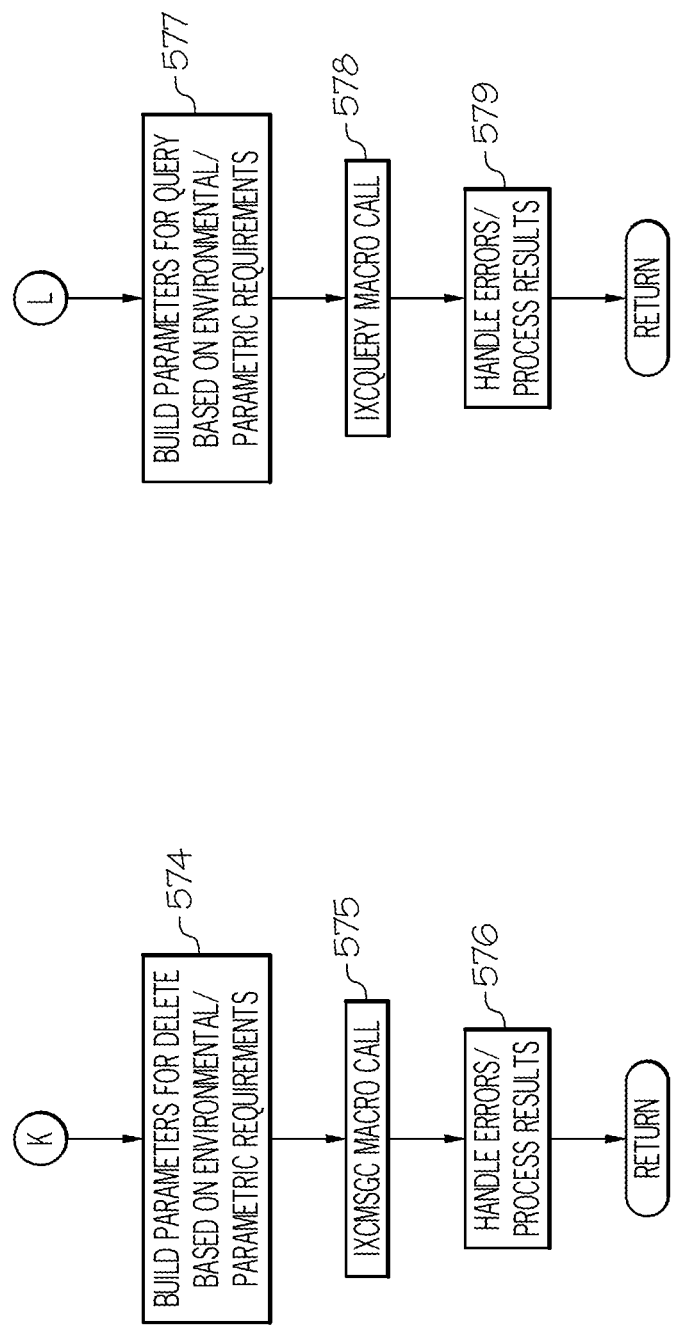

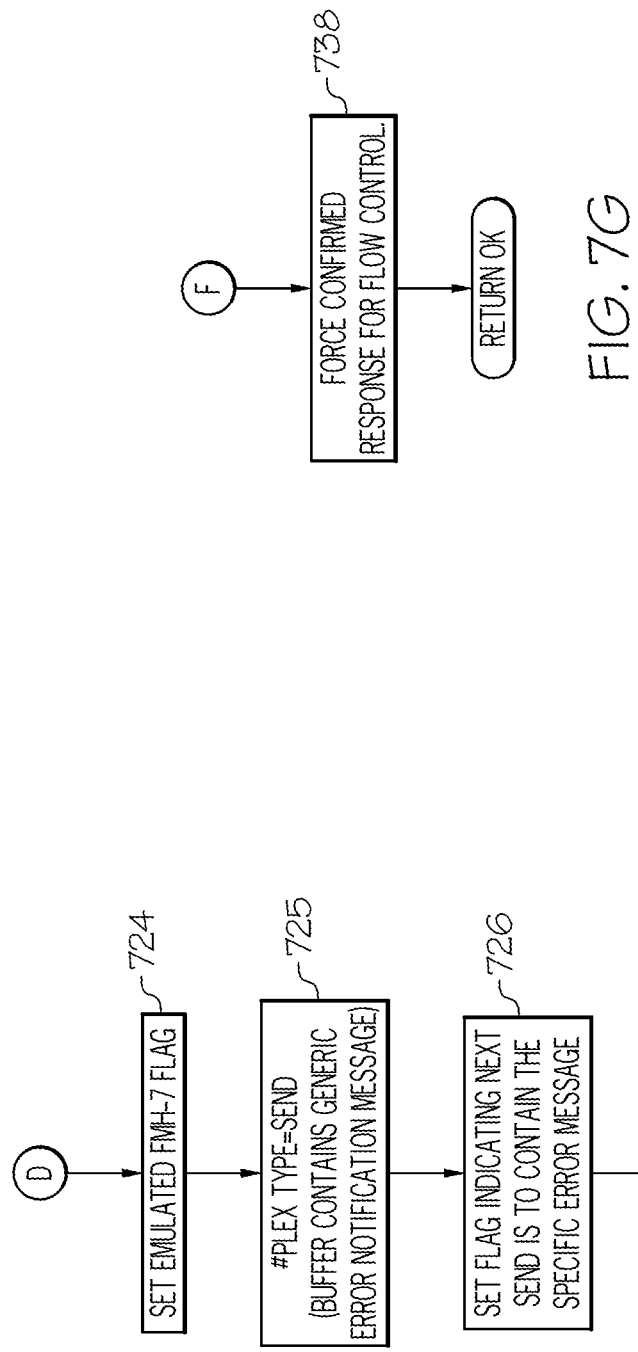

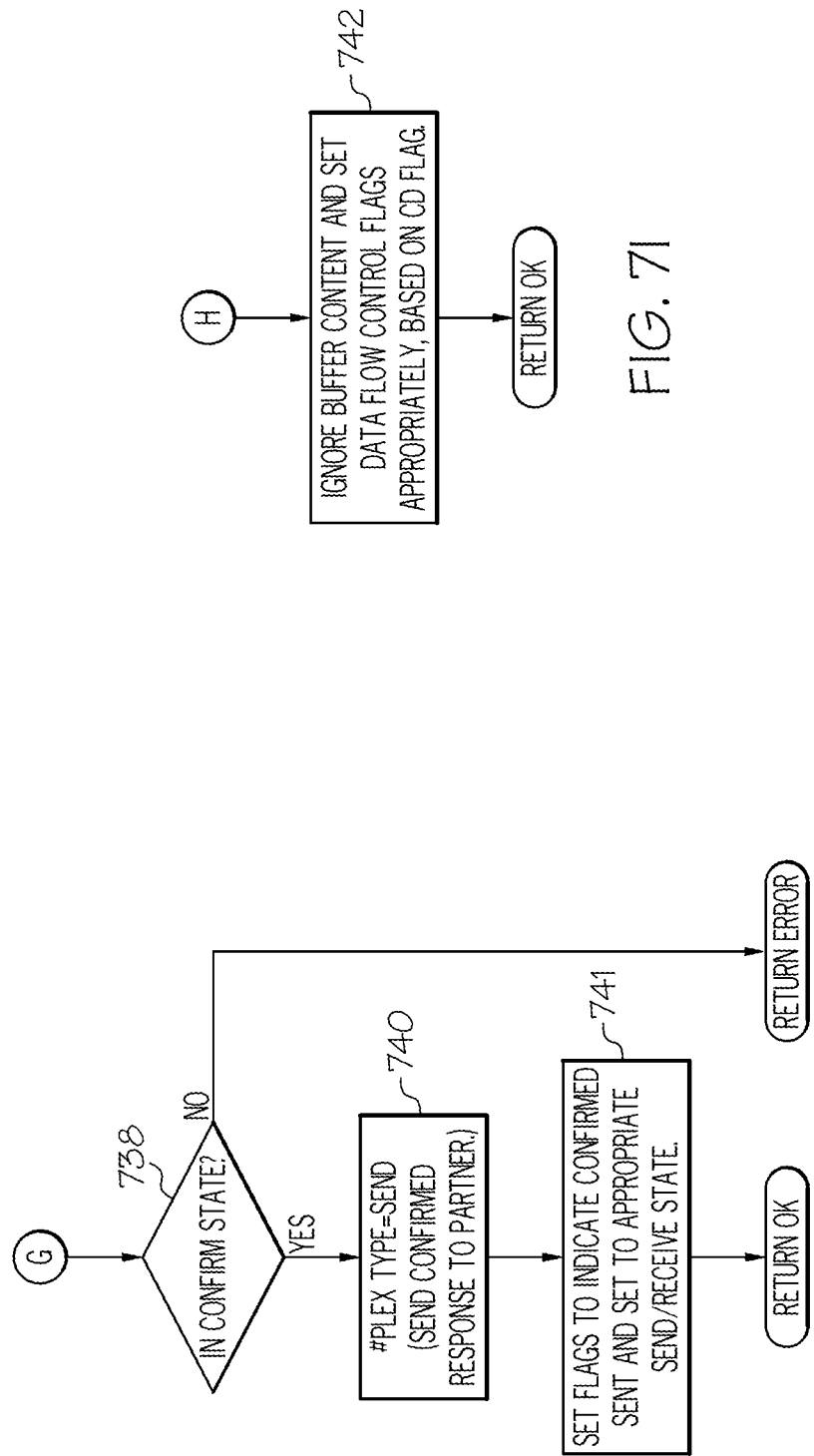

LISTENING FOR EXTERNALLY INITIATED REQUESTS

RELATED APPLICATIONS

This application claims the benefit of Provisional Patent Application No. U.S. Ser. No. 61/824,044, filed, May 16, 2013, entitled PLEXQ, by Bruce A. Schaefer, the disclosure of which is incorporated herein by reference.

BACKGROUND

The present disclosure relates to data transfers, and more specifically, to negotiated, or coordinated data transfers.

A variety of different ways exist to exchange files and other data between two systems. One example way can involve negotiated, or coordinated, data transfers. A client system, or sending system, schedules a data transfer with a server system, or receiving system, and at the scheduled time the client system transmits the data to the server system which stores the transferred data in a designated storage location. In such an environment, user data transfers occur as do meta-transfers. These meta-transfers relate to exchanging meta-data about the data transfers that are scheduled, ongoing, or completed. Data transfers of user data can include file transfers, executable job transfers, and report transfers.

At the receiving end, a plurality of receiving systems can form a pool of available systems to receive a data transfer from a sending system. One result of scheduling a particular data transfer and exchanging meta-data about that transfer is that one particular receiving system can be selected for the transfer of user data. That one particular receiving system can be selected based on how busy each of the plurality of receiving systems is in order to select the receiving system which is least busy. However, to perform these scheduling and selecting activities, a separate administrative server is used that acts as a communications middleman between the plurality of receiving systems and the sending system. In particular, messages are sent from the sending system to the administrative server and, based on what it receives, the administrative server determines what and how to communicate with the plurality of receiving systems. Any responses from the plurality of receiving systems are delivered to the administrative server which, then determines how to appropriately communicate the information in those responses to the sending system.

BRIEF SUMMARY

According to an aspect of the present disclosure, a method for processing a request from a sending computer that is a co-member of a message group of a sysplex coupled together using a signaling service includes determining, by a receiving computer, that a signaling service message has been received from the sending computer, wherein the signaling service message relates to a data transfer between the sending computer and the receiving computer and wherein the data transfer relates to an exchange of one or more files between the sending and receiving computers using a communications channel other than the signaling service. The method also includes decoding, by the receiving computer, the signaling service message to determine contents of the signaling service message related to the data transfer; and performing, by the receiving computer, an action related to the data transfer based on the contents of the signaling service message.

According to another aspect of the present disclosure, a computer program product for processing a request, received at a receiving computer and sent by a sending computer that are co-members of a message group of a sysplex coupled together using a signaling service includes a non-transitory computer readable storage medium having computer readable program code embodied therewith. The computer readable program code comprises computer readable program code configured to determine that a signaling service message has been received from the sending computer, wherein the signaling service message relates to a data transfer between the sending computer and the receiving computer and wherein the data transfer relates to an exchange of one or more files between the sending and receiving computers using a communications channel other than the signaling service. The computer readable program code also comprises computer readable program code configured to decode the signaling service message to determine contents of the signaling service message related to the data transfer; and computer readable program code configured to perform an action related to the data transfer based on the contents of the signaling service message.

According to yet another aspect of the present disclosure, a system for processing a request from a sending computer that is a co-member of a message group of a sysplex coupled together using a signaling service, the system comprising includes a processor and a memory coupled to the processor, the memory configured to store program code executable by the processor. The program code includes program code, when executed by the processor, configured to determine that a signaling service message has been received from the sending computer, wherein the signaling service message relates to a data transfer between the sending computer and the system and wherein the data transfer relates to an exchange of one or more files between the sending computer and the system using a communications channel other than the signaling service. The program code also includes program code, when executed by the processor, configured to decode the signaling service message to determine contents of the signaling service message related to the data transfer; and program code, when executed by the processor, configured to perform an action related to the data transfer based on the contents of the signaling service message.

BRIEF DESCRIPTION OF THE DRAWINGS

Aspects of the present disclosure are illustrated by way of example and are not limited by the accompanying figures with like references indicating like elements.

FIG. 7A-7M depict a flowchart of an example process for protocol conversion of communication macro routine calls in accordance with the principle of the present disclosure.

DETAILED DESCRIPTION

Figure 1:
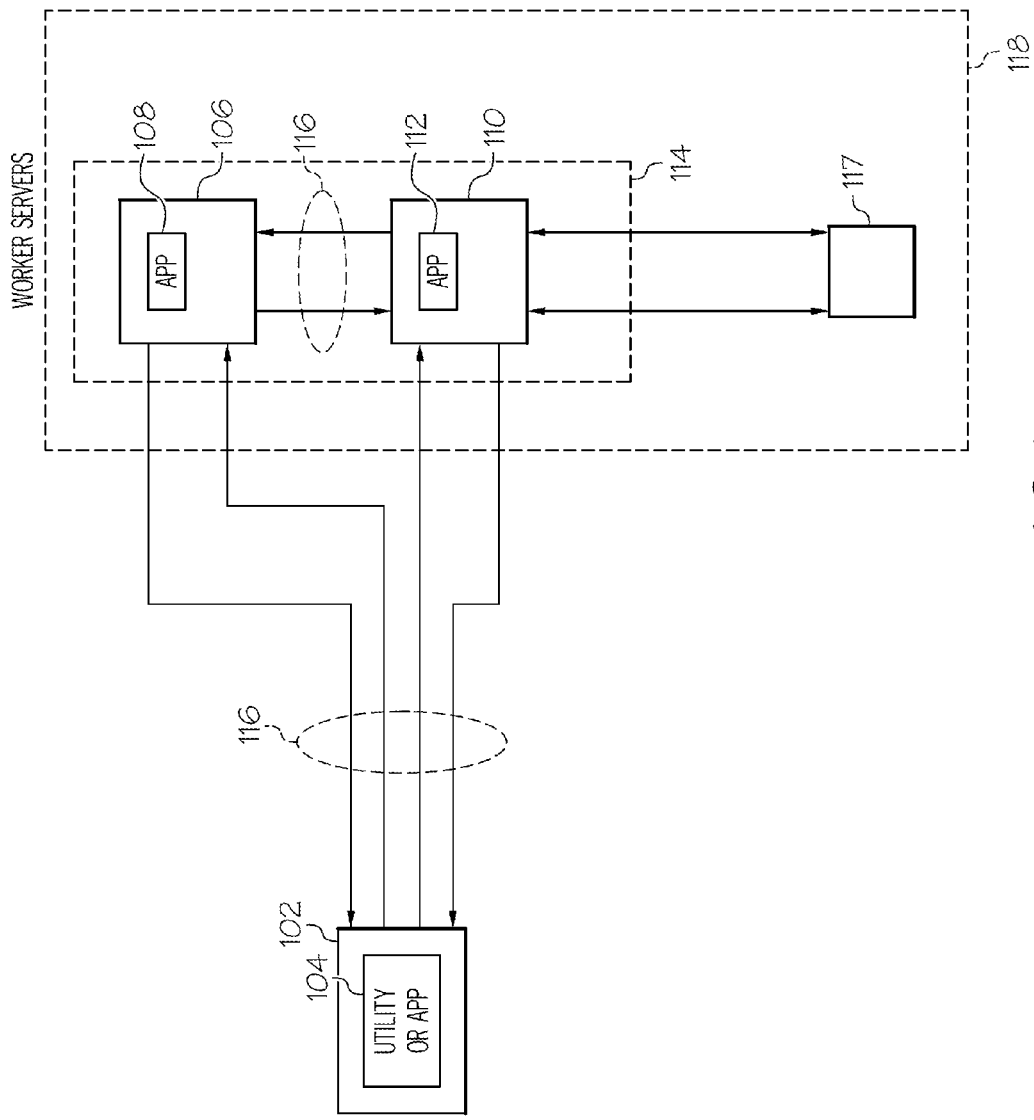
FIG. 1 illustrates an example environment in which different systems can cooperatively interact to effect data transfers in accordance with the principles of this disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Multisystem Application Program

A multisystem application program can be designed to have a corresponding portion execute on each one of a plurality of respective systems. These systems include communication paths that allow for the exchange of data amongst the plurality of systems. In some circumstance, a subset of the plurality of systems can be logically grouped together to form a message group. Creating a logical classification of "members of a message group" allows for operations such as "receive a message from another member", "transmit a message to all members", "exit the group", etc. While one of ordinary skill will recognize that there are many ways to create such functionality, a description is provided below that includes details about a particular implementation of how systems can be coupled together to for logical groups. The description provides details regarding cross-system coupling within an MVS environment.

The multisystem application program can be designed and implemented to exploit a cross-system coupling facility such as cross-system coupling facility (XCF) and to define one or more members to a group that resides in a sysplex. A sysplex (systems complex) is a set of one or more systems (e.g., MVS™ systems) that is given an XCF sysplex name and in which any authorized programs in the systems can then use XCF services. XCF services are available in both single and multisystem environments. A multisystem environment is defined as two or more MVS systems residing on one or more processors. XCF establishes network communication in a sysplex. This allows applications in a sysplex to transmit (send and receive) data across systems. With XCF, applications can distribute specific functions between multiple processors and/or systems. As a result, an installation can spread the processing workload across the sysplex, taking advantage of individual system features, as well as providing capabilities for the applications.

A group, or message group, is a set of related members of the sysplex defined to XCF by a multisystem application in which members of the group can communicate (send and receive data) between MVS systems with other members of the same group. A group can span one or more of the systems in a sysplex and represents a complete logical entity to XCF.

A multisystem application is defined as a program that has various functions distributed across MVS systems in a multisystem environment.

A member is a specific function (one or more routines) of a multisystem application that is defined to XCF and assigned to a group by the multisystem application. A member resides on one system in the sysplex and can use XCF services to communicate (send and receive data) with other members of the same group. However, a member is not a particular task and is not a particular routine. The member concept applies to all authorized routines running in the address space in which the member was defined. The entire address space has the ability to act as that member. All tasks and service request blocks (SRBs) in that address space can request services on behalf of the member.

When a member is defined, it can be associated with the address space in which the "join a group" command (e.g., IXCJOIN) was issued. The member terminates when the address space terminates or when the system terminates. A member's existence can also be tied to a more specific unit of work by associating the member with either the task or job step task in which the IXCJOIN was issued.

Members of XCF groups are unique within the sysplex. However, XCF allows the definition of more than one member from the same task or address space, and to have those members belong to different XCF groups.

XCF provides signaling services that allow communication between members in a sysplex. For example, XCF provides a set of macros that can be invoked by user programs to send and receive messages from other members. In particular, in XCF, a macro IXCMSGOX is provided for sending message, IXCMSGIX is provided for receiving messages, and IXCMSGC is provided for saving, discarding, reprocessing, forcing a message to completion or obtaining information about messages. A signaling service message is any piece of information that one member of a message group wants to transmit to another member. The data that makes up the message is of interest to the multisystem application only and not the operating system that is providing the signaling service. A message can vary in length and includes the data that makes up a message and an additional portion of control information that can be associated with each message. For example, signaling services provided within XCF can generate messages that include 32 bytes of control information that is separate from the data, or payload, of a message.

In operation, a message user routine is written that provides a mechanism for receiving messages from other members of the message group. When a member joins a message group, the address of the message user routine is specified and control is given to this routine when a message is received by that member. XCF is designed to pass information about the message to the message user routine. For example, XCF can pass a parameter list and values as well as set one or more control registers based on the message.

When an active member of a message group issues an IXCMSGOX macro to send a message to another active member of the same group, XCF asynchronously passes control to the message user routine of the target member. The message user routine runs in service request block (SRB) in the target member's primary address space (i.e., the "joiner's" address space). The user routine is responsible for handling the message and returning control to the system. Some of the tasks that the message user routine is responsible for include:

Checking the message control information area (32 bytes of data passed as part of the parameter list);

Determining whether there is a message to be received (e.g., the MESSAGE LENGTH may="0");

Determining where to place any data in the message buffer area;

Determining the type or format of the data in the message buffer area;

Obtaining enough memory to contain all the data in the message buffer area;

Receiving the message by invoking the IXCMSGIX macro; and

Processing the data in the message, or queuing the message to a task for processing and POSTing the task.

In general, message user routines should be reentrant programs as there could be multiple instances of the message user routine running concurrently. Because XCF does not natively provide acknowledgement that a target member has received a message, the message user routine can provide such an acknowledgement if desired.

Two different types of messages can be received by a group member: a) messages sent to a member by other members, and b) response messages that are sent to a member by other members in response to a previous message sent by that member. Different message user routines can be written to handle each type of received message. When the member issues an IXCJOIN macro to join the message group, an address for one message user routine can be specified using the "Message User Exit" parameter to handle the first type of messages. An address for a second message user routine can be specified using the "Notify User Exit" parameter to handle the second type of messages. The address for the second message user routine can also be specified using the "Notify User Exit" parameter when issuing the IXCMSGOX macro to send the original message.

Data Transport Function

One example of a multisystem application that can utilize the XCF and message group facilities described above can involve negotiated, or coordinated, data transfers. In such an environment, user data transfers occur as do meta-transfers. These meta-transfers relate to exchanging meta-data about the data transfers that are scheduled, ongoing, or completed. Data transfers can include file transfers, executable job transfers, and report transfers. Within this environment, a number of receiving systems can form a pool of available systems to receive a data transfer from a sending system. The sending system sends details about a possible data transfer to one or more of the available receiving systems and one of the available systems is selected to complete the data transfer. The data transfer can be immediately started or could occur at some future specified time. Although the term "system" is used in the above description, the system may be software executing on a hardware platform within an operating system environment to perform the roles of a server, a client, or both in order to achieve data transfers with other systems.

A particular example of such a data transfer system includes CA XCOM Data Transport® which is a family of software products that operates under SNA using LU 6.2, or under TCP/IP, to provide high-speed data transfer between supported systems such as mainframes, midrange, PCs, servers, and workstations. It allows the sending of files from their local system to remote systems across an SNA network or using TCP/IP, and retrieve files from those remote systems. The same transfer capabilities are available to the local and remote systems.

To understand the data transport function in a very simplified and generalized way, consider a scenario. For example, when a local system transfers a file to a remote (partner) system, following steps are performed:

1. Initiation: The user submits a batch program and starts the menu (the menu interface) or a customer program to initiate the transfer.

2. Information verification: The data transfer system verifies the information contained in the request. For example:
   When requesting a send file transfer, the system can check whether the local file exists on the local system.
   When requesting a receive file transfer, the system can check whether the file exists on the remote system.

3. Information confirmation: Once the information is confirmed, the system can start the file transfer.

4. Completion: When the transfer completes the system can log the details of the transfer in a log.

Returning to the example of CA XCOM Data Transport®, this data transfer system allows: a local system to send a data file to be stored on the remote system in a specified remote file; a local system to send a report to be printed on a remote system; a local system to send a job to be executed on a remote system; and a local system to retrieve a file from a remote system and store it in a specified local remote file.

One beneficial feature of a data transfer system is to support checkpoint/restart. Transfers that are stopped or fail prior to completion should automatically resume, continuing from the last checkpoint.

An important feature for any enterprise-wide information product is the ability to effectively control and manage the distribution of files and work throughout the network. CA XCOM Data Transport® systems, for example, can maintain a comprehensive log of all transfer activity. Utilities can be provided to allow the system administrator to view the log online and modify the status of pending or currently active transfers. Details of any transfer errors are can also be maintained in the log, allowing rapid problem determination and resolution. In addition, messages signaling the completion of any data transfer event can be directed to a user in the network.

Control Blocks

Typical operating systems are made up of programming instructions that control the operation of the computer system. These instructions ensure that the computer hardware is being used efficiently and is allowing application programs to run. z/OS®, for example, includes sets of instructions that, for example, accept work, convert work to a form that the computer can recognize, keep track of work, allocate resources for work, execute work, monitor work, and handle output. A group of related instructions is called a routine or module. A set of related modules that make a particular system function possible is called a system component. The workload management (WLM) component of z/OS®, for instance, controls system resources, while the recovery termination manager (RTM) handles system recovery.

Sequences of instructions that perform frequently used system functions can be invoked with executable macro instructions, or macros. Example macros may exist for functions such as opening and closing data files, loading and deleting programs, and sending messages to the computer operator. As programs execute the work of a z/OS® system for example, they keep track of this work in storage areas known as a control block. In general, there are four types of z/OS® control blocks: System-related control block, Resource-related control blocks, Job-related control blocks, and Task-related control blocks.

Each system-related control block represents one z/OS® system and contains system-wide information, such as how many processors are in use. Each resource-related control block represents one resource, such as a processor or storage device. Each job-related control block represents one job executing on the system. Each task-related control block represents one unit of work. Control blocks serve as vehicles for communication throughout the operating system. Such communication is possible because the structure of a control block is known to the programs that use it, and thus these programs can find needed information about the unit of work or resource. Control blocks representing many units of the same type may be chained together on queues, with each control block pointing to the next one in the chain. The operating system can search the queue to find information about a particular unit of work or resource, which might be: an address of a control block or a required routine; actual data, such as a value, a quantity, a parameter, or a name; and status flags (usually single bits in a byte, where each bit has a specific meaning).

Thus, one way to "manage" a resource in an operating system is through the concept of the control block. With respect to resources, "manage" means to know the location and status of the resource and to be able to create, modify, and delete the resource. Resources include tasks, jobs, users, address spaces, devices, etc. A control block can be a contiguous string of bytes in memory that represents, or describes, a resource. As mentioned above, typically, there is one control block for each specific instance of each resource. In z/OS®, for example, every batch job and system task runs in its own address space which is represented by an address space control block (ASCB).

Work in an address space is typically organized into "tasks," with each task being generally independent of other tasks in the address space. Each task is made up of requests (e.g., request for a system service, request to run a program). Each task is represented by a task control block and each request is represented by a request block. Thus, in z/OS® for example, dispatchable units of work are represented by two kinds of control blocks: task control blocks and service request blocks.

Task control blocks (TCBs) represent tasks executing within an address space, such as user programs and system programs that support the user programs. A TCB contains information about the running task, such as the address of any storage areas it has created. TCBs are created in response to an ATTACH macro. By issuing the ATTACH macro, a user program or system routine begins the execution of the program specified on the ATTACH macro, as a subtask of the attacher's task. As a subtask, the specified program can compete for processor time and can use certain resources already allocated to the attacher's task.

The region control task (RCT), which is responsible for preparing an address space for swap-in and swap-out, is the highest priority task in an address space. All tasks within an address space are subtasks of the RCT.

Service request blocks (SRBs) represent requests to execute a system service routine. SRBs are typically created when one address space detects an event that affects a different address space; they provide one mechanism for communication between address spaces.

The routine that performs the function or service is called the SRB routine, and initiating the process is called scheduling an SRB. The SRB routine runs in the operating mode known as SRB mode. An SRB is similar to a TCB in that it identifies a unit of work to the system. Unlike a TCB, an SRB cannot "own" storage areas. SRB routines can obtain, reference, use, and free storage areas, but the areas must be owned by a TCB. In a multiprocessor environment, the SRB routine, after being scheduled, can be dispatched on another processor and can run concurrently with the scheduling program. The scheduling program can continue to do other processing in parallel with the SRB routine. As mentioned earlier, an SRB provides a means of asynchronous inter-address space communication for programs running on z/OS®.

Only programs running in a mode of higher authority called supervisor state can create an SRB. These authorized programs obtain storage and initialize the control block with things such as the identity of the target address space and pointers to the code that will process the request. The program creating the SRB then issues the SCHEDULE macro and indicates whether the SRB has global (system-wide) or local (address space-wide) priority. The system places the SRB on the appropriate dispatching queue where it will remain until it becomes the highest priority work on the queue.

Example Network Environment

FIG. 1 illustrates an example environment in which different systems can cooperatively interact to effect data transfers in accordance with the principles of this disclosure. A number of systems, also referred to as worker servers, are grouped together in a sysplex 118. In particular, system 106, system 110 and system 117 are connected in such a way as to form a sysplex 118. In addition, there is an application 108 that is persistently executing on system 106 and a similar application 112 executing on system 110. These software applications 108, 112 can be individually referred to as "a server," and together they form a multisystem application.

More specifically, the servers 108, 112 are members of a message group 114, which they could each join when they first began execution.

Another system 102 can communicate with the message group 114, which allows the system 102 to communicate with each of the servers 108, 112. An application program 104 also executes on the system 102. This program 104 may be a server similar to the other servers 108, 112 already discussed or could be a utility program that has more limited functionality. The application 104 can join the message group 114 when it wants to interact with the servers 108, 112 and then leave the message group 114 once its tasks have been accomplished. In contrast, the servers 108, 112 typically are designed to maintain their membership in the message group 114. As an example, the application 104 can be a JCL batch job that wants to schedule a data transfer from the system 102 to one of the systems 106, 110 where the servers 108, 112 reside.

One aspect of belonging to a message group is that the members can exchange messages over a communications path, or communications channel, defined by the signaling services provided by an operating system and cross-system connection facilities. These communications paths are shown logically as "signaling service" 116 and are described in more detail in FIGS. 2A and 2B.

Figure 2A:
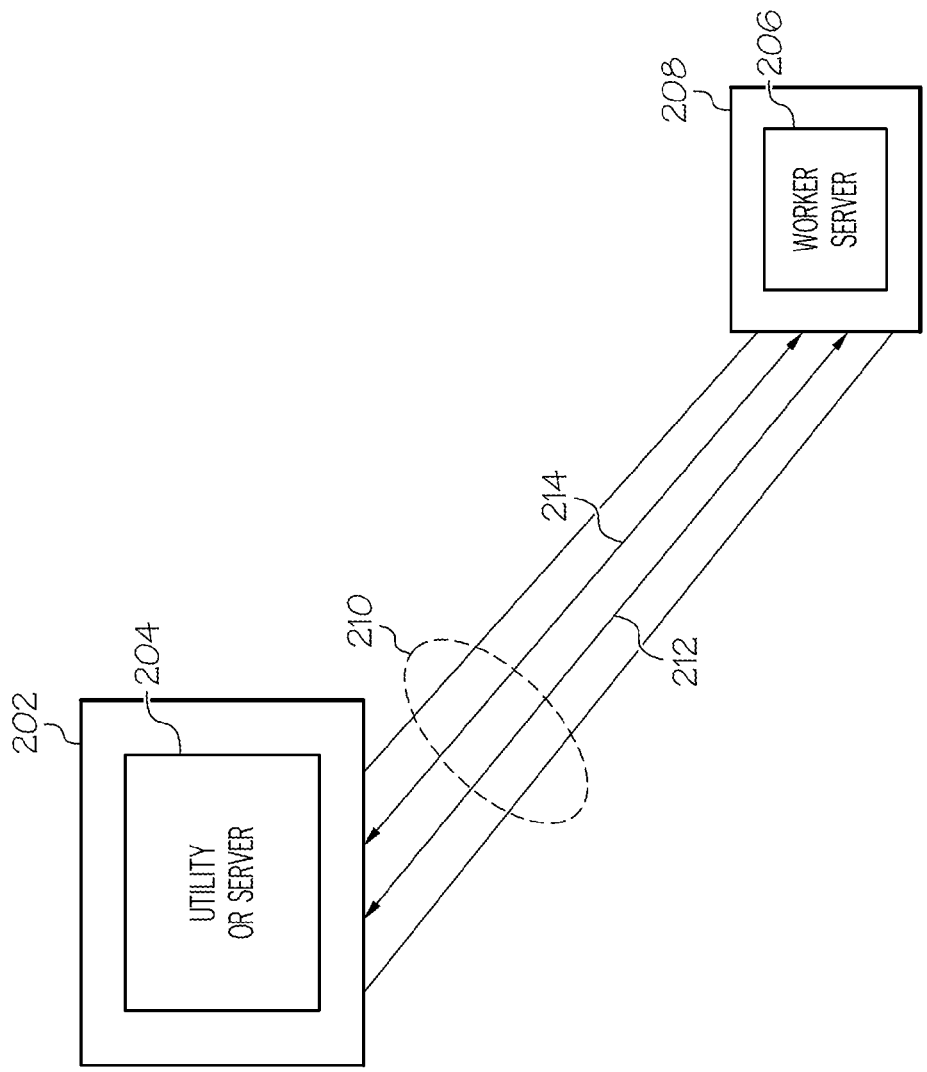
FIG. 2A illustrates a single coupling between two systems that can communicate in accordance with the principles of the present disclosure.

FIG. 2A illustrates a single coupling between two systems communicating in accordance with the principles of the present disclosure. A system 202 running a utility application 204 may want to exchange messages with a worker server 208 running on a remote system 206. These system 202, 206 may be connected with a single physical link 210. For example, the physical link 210 can include an Ethernet cable or a wireless link. However, that single physical link 210 may support a number of different types of logical communication channels. Two such logical communication channels 212, 214 are shown in FIG. 2A such that the systems 202, 206 can be described as "coupled" together via either of the logical communication channels 212, 214. As described below with reference to FIG. 2B, two separate physical links can also be used to couple systems together. Thus, in that instance, each of the two logical communications channels 212, 214 of FIG. 2A would be paired with its own, respective separate physical link as well to achieve such coupling.

Figure 2B:
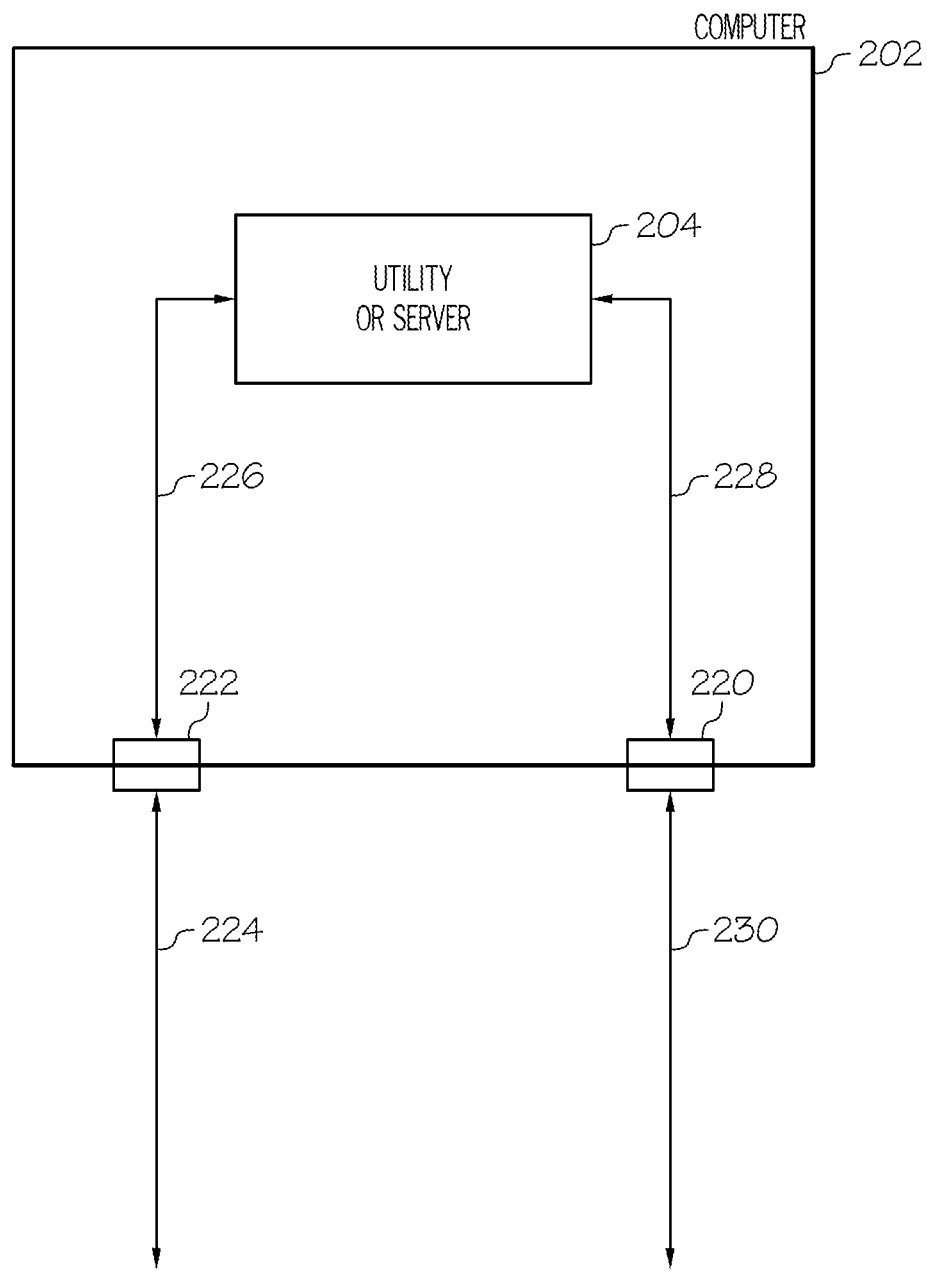
FIG. 2B and FIG. 3 illustrate details about how a system can couple to other systems to be part of a sysplex and also be part of a local network in accordance with the principles of the present disclosure.

FIG. 2B illustrates details about how a system 202 can couple to other systems to be part of a sysplex and also be part of a local network. In particular, the system 202 can include a network interface 222 that is connected to an IP network. Furthermore, the utility application 204 includes some parameter setting that determines which IP port it listens to for incoming messages. Thus, network packets 224 can be formed at a sending system in such a way that they specify an IP address and port number that are appropriate to deliver the packets 224 to the utility application 204 running on the system 202. The operating system of the computer 202 provides a TCP/IP network stack 226 to facilitate communications in this manner.

Separate from the network interface 222, the system 202 also includes a channel-type connection 220. All participating members of a sysplex connect via a channel-type connection 220. Signaling service messages 230 are delivered to, and transmitted from, this type of connection and, within the operating system, signaling services functionality 228 is provided to deliver messages to, and receive messages from, the utility application 204 and this channel-type connection 220.

Figure 3:
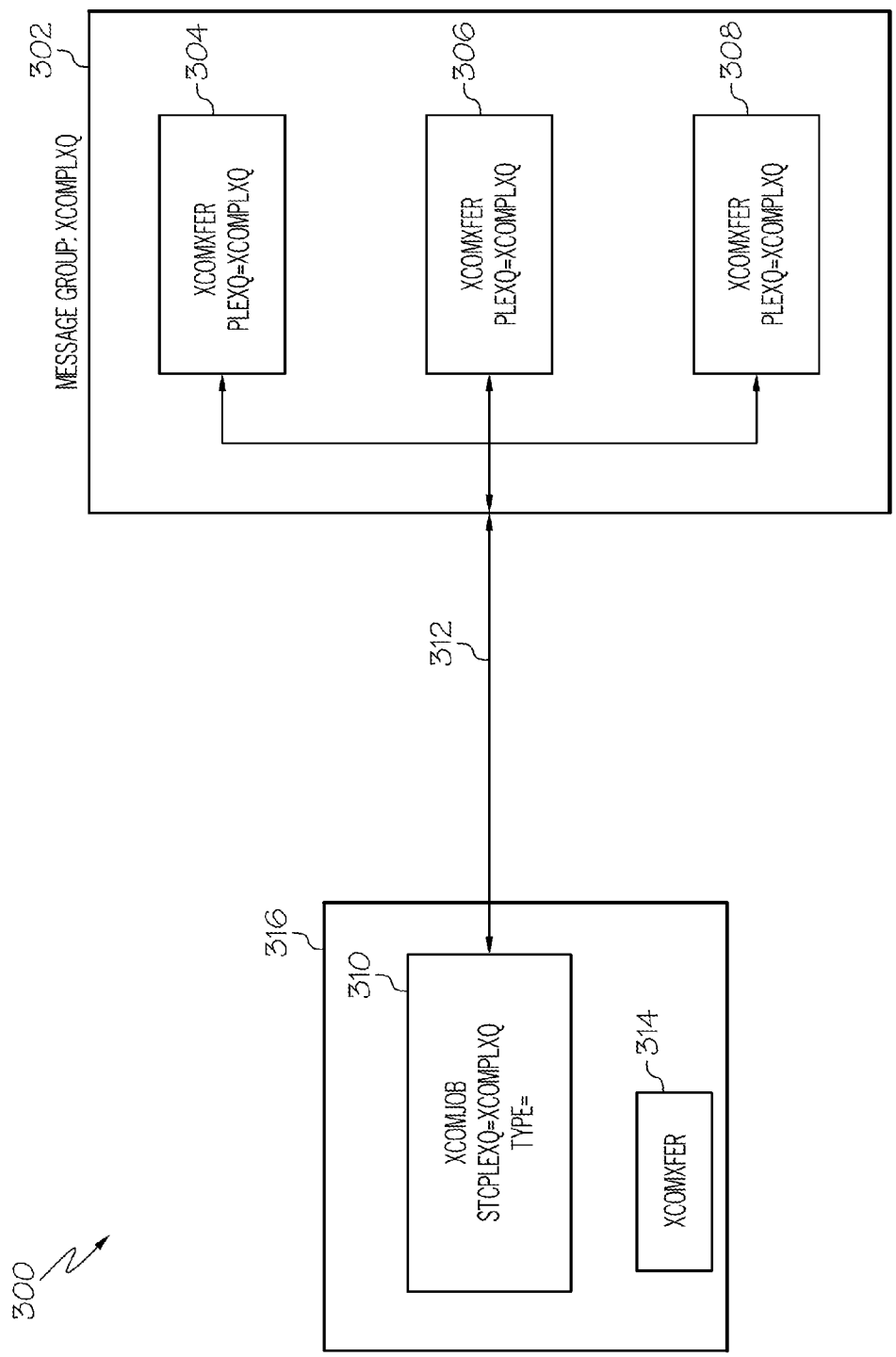

FIG. 3 illustrates a more specific example network environment 300. In this environment 300, a utility program XCOMJOB 310 is communicating with the message group XCOMPLEXQ 302 with regards to previous, ongoing, or completed data transfers involving the message group XCOMPLEXQ 302. In particular three different data transport servers XCOMXFER 304, 306, 308 joined the message group XCOMPLEXQ 302 when each first started execution. XCOMJOB 310 can temporarily join the message group 302 when communicating with all three servers 304, 306, 308 via signaling services 312. Within the environment 300, data transport functions as described in an earlier section can take place amongst the different applications 304, 306, 308, and 310. Also, within the environment 300 of FIG. 3, each server 304, 306, 308 may have an identifier "ServerID" that uniquely identifies it within the message group. Similarly, XCOMJOB 310 can be assigned a name when it is invoked; it is this name that the other group members can use when responding back to XCOMJOB 310. As shown, XCOMJOB 310 can run on a system 316 that is also hosting its own server XCOMXFER 314.

However, of interest to the present disclosure are the meta-data communications that can be exchanged between systems that relate to an actual data transfer. In particular, internal data transport meta-data can include data related to scheduling, inquiring upon, or managing file transfers. In accordance with the principles of the present disclosure, a protocol is developed by which meta-data can be exchanged with one or more data transport servers that are members of the same message group. This protocol can include a definition of the data format that is used to process the communication. Additionally, part of the protocol definition can include techniques for controlling the flow of data between message group members. Using this protocol, commands and their corresponding responses can also be exchanged between message group members. For convenience, data transport servers may be referred to as "XCOM servers" herein and message groups within a sysplex may be referred to as "PLEXQ groups".

Figure 4:
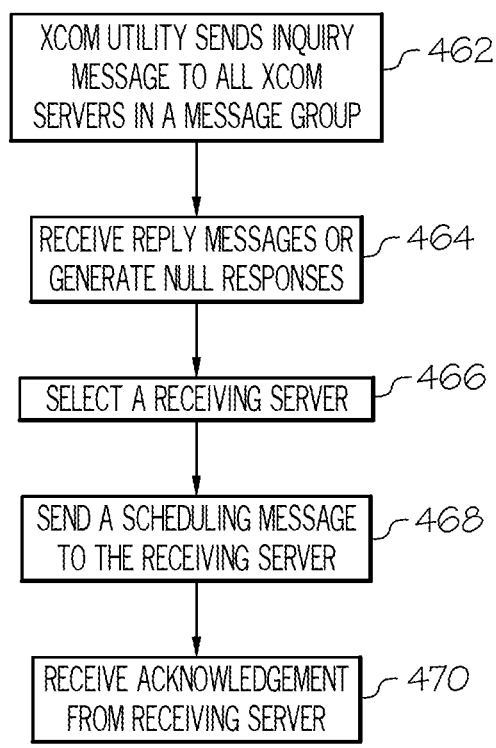
FIG. 4 depicts a flowchart of an example method of implementing data transport functions in accordance with the principles of the present disclosure.

FIG. 4 depicts a flowchart of an example method of implementing data transport functions in accordance with the principles of the present disclosure. In step 462, an XCOM utility, invoked to initiate transfer of data to a remote partner via an XCOM server, sends an inquiry message to all potential candidate servers which can host the transfer (i.e., within the same PLEXQ group). In particular, the inquiry message asks each potential server to provide a reply message about its current workload. The inquiry message is generic and is sent to all tasks connected to the PLEXQ group, except itself. Only servers, however, respond to the inquiry message. Other XCOM utilities that might be members of the PLEXQ group do not respond.

In step 464 replies are received by the XCOM facilities from the XCOM servers in the PLEXQ group. A null response is generated on behalf of any servers that do not respond within a pre-determined length of time, effectively removing those servers from consideration. Based on the reply messages, the XCOM utility program selects, in step 466, a receiving server for the data transfer. Reply messages can include such information as Server ID (PLEXQ MEMBER name), transaction or job ID, the corresponding token that uniquely identifies the server in the PLEXQ group, and a numerical rank of the server's suitability to receive new work requests. The token can be used to uniquely identify a subsequent thread of related messages, and their temporal sequence can be maintained in First-In-First-Out order.

Next, in step 468, the XCOM utility sends a scheduling message (SCHEDULE request) informing the receiving server of transfer specifics such as sending and receiving file names, locations (if necessary) that the XCOM utility wants to transfer, along with the time the transfer is to start (which may, for example, be based on the initiating server's clock) or immediately. Full and complete details about the transfer are contained within the buffer, which is wholesale transmitted to the selected server so that the transfer may be performed. Values not supplied in the request buffer are either defaulted or taken from the initiating server's configured values.

The server that receives the transfer schedule request acknowledges the success or failure of the SCHEDULE request by sending back an XCOM specific message where they are received in step 470. Successful SCHEDULE requests receive the request number of the newly-created transfer request, while failed SCHEDULE requests receive a message with specific information about the failure. Beginning with step 468, all communication between the XCOM utility and the selected server are exchanged directly between those two tasks—as opposed to being broadcast to all members of the same PLEXQ group. However, all the messages exchanged in steps 462-470 may be sent via the signaling service.

Now that the signaling service messages have been used to schedule the transfer, the PLEXQ interaction between the XCOM utility and the server is complete. The actual data transfer is performed as it typically has been done in the past over a network link such as TCP/IP or SNA. In the case of multiple transfers being scheduled within one execution of the XCOM utility, the process starts over beginning with the sending of the inquiry message for the selection of the best candidate server to receive the request. This process is done for each transfer request individually.

In addition to the ability to SCHEDULE transfers via the signaling service of the PLEXQ group, it is also possible to programmatically INQUIRE on the status of those individual transfers directly from the server to which the transfer was scheduled. This can be accomplished using specific information (e.g., PLEXQ group name, MEMBER name, and a unique identifier used to locate the transfer request), which may all be included in the received schedule confirmation message of step 410.

The ability may also be implemented to retrieve status information (including HISTORY) of pending, active and completed transfers, which can then be written to an output file for further processing. In this case, a single request can be broadcast to all servers in the PLEXQ group and each server begins sending these status (or HISTORY) records back to the requesting XCOM utility. It is this flow of information that can use the flow control techniques so as not to overwhelm the XCOM utility with incoming status records. Again, of particular interest to the present disclosure is the managing of the meta-data request/response interaction with one or more servers.

When they execute, XCOMJOB utility jobs connect to a message group, to which worker servers have already joined. The XCOMJOB utility communicates with the member servers in the message group to manage data transfer workload and activity. Using the XCF signaling service allows for a new protocol that may be substituted for SNA and TCP/IP when performing meta-transfers between XCOMJOB and XCOM servers. A message group can be used to communicate with one or many servers, thus it can be used as an alternate protocol for performing transfer scheduling and inquiry for even an individual server.

In the description below, reference is frequently made to setting parameter values. One example way to accomplish this is to define a configuration dataset. It can include a collection of startup parameters and default values that are applied to the XCOM region to be used for server initialization. A "region" refers to a collection of system resources allocated to a particular server. Other parameter values can be passed to specific executing jobs by passing the name of an appropriate configuration dataset for that particular job. One benefit of using the signaling service is that a message exists only until it has been processed by the Message Exit which runs as an SRB in the target member's address space. No special or additional configuration of the signaling service needs to be performed, and the number of potential members is limited only by the resources (or configuration) of the XCF that serves to host a message group.

The data transport server (e.g., XCOMXFER) can include the following features that will facilitate communicating meta-data in accordance with the principles of the present disclosure:

define a parameter (PLEXQ) within the existing server to allow the specifying of a message group name to which the server is to join as a member;

configure storage management macro calls in the server and the XCOMJOB utility to support both TASK and SRB mode;

define a parameter (STCPLEXQ) to the XCOMJOB utility to allow specifying of the message group name to which the XCOMJOB batch utility is to connect to process messages;

a service module (XCOMPLEX) which contains code to issue the IXCxxxxx macro calls to interface with the signaling service module of the operating system, and which also contains the exit code which gets dispatched to process incoming messages and responses;

a listener module (XCOMRANQ) which will process commands received via the signaling service from other XCOM regions, and to also process work queued by the message handling exits;

a high-level interface module (XCOMHVTQ) which will process standard network commands (e.g., #SEND, #RECEIVE, etc.) and convert them for processing over the signaling service;

define a control block PLXDSECT to provide storage for maintaining status information and work areas for messages utilizing the signaling service;

a #PLEX macro which invokes signaling services using the above-mentioned XCOMPLEX service module; and a #PLEXQ macro to create, enqueue, dequeue, and free entries on a chain which holds queued requests for work and data buffers related to messages using the signaling service, and to define the layout of an individual chain entry. For convenience, the chain can be referred to herein as a "PLEXQ chain" and each entry can be referred to as a "PLEXQ entry".

A data transport server (e.g., XCOMXFER) can be considered as a collection of cooperative modules that operate together to accomplish desired tasks related to data transfers. Thus, in additional to a variety of modules that operate to accomplish actual user data transfers, XCOMXFER supports the modules discussed above such as XCOMPLEX, XCOMRANQ, and XCOMHVTQ. Because some of the signaling services related activities may operate in either TASK or SRB modes, all routines that obtain or free virtual storage for dispatched work should use STORAGE OBTAIN/RELEASE macro calls available from the operating system.

XCOMJOB

The utility program XCOMJOB mentioned above can be thought of as the primary user interface for data transfer related processing. As such, XCOMJOB will be able to support the signaling services infrastructure modules XCOMPLEX and XCOMHVTQ. Similar to the server, all XCOMJOB routines that obtain or free virtual storage for dispatched work should use STORAGE OBTAIN/RELEASE macro calls available from the operating system. As discussed more fully below, XCOMJOB attaches the appropriate Transaction Program based on the TYPE=parameter provided when XCOMJOB is invoked.

The executable utility (e.g., XCOMJOB) can run on a local system and be invoked to perform a data transfer related task or activity. In JCL, for example the following snippet could be used:

//STEP01 EXEC PGM=XCOMJOB,
//                        PARM=('TYPE=SCHEDULE, DFLTAB=XCOMDFLT,STCPLEXQ=PLEXQ1')

This JCL snippet uses "PARM" to pass a string of parameters such as the type task to perform (e.g., SCHEDULE), a set of default settings for variables and options (e.g., XCOMDFLT), and the name of a message group that includes one or more worker servers (e.g., PLEXQ1). Three different types of activities that may be beneficial to treat separately is SCHEDULE, EXECUTE, and INQUIRE. TYPE=EXECUTE relates to when a file from the local system is sent to replace a file on a remote system through the execution of a non-queued transfer. TYPE=SCHEDULE is when a file from the local system is sent to replace a file on a remote system through the execution of a queued transfer. TYPE=INQUIRE relates to examining the status of those file transfers.

TYPE=INQUIRE does not initiate file transfers, unlike the TYPE=EXECUTE and TYPE=SCHEDULE modes, but examines the status of transfers that were previously initiated by TYPE=SCHEDULE. It waits until the transfers have completed and issues a return code reflecting the status of the transfers.

The primary use of TYPE=INQUIRE is in batch job streams where some job steps are dependent upon the successful completion of other job steps that transfer files. The dependent steps can execute conditionally based on the return code issued by TYPE=INQUIRE.

When a transfer is scheduled, an INQUIRE data set may be included in that JCL so that the request number and a time stamp can be written into the INQUIRE data set. In the INQUIRE step, this same request number can be used to reference the same INQUIRE data set. The INQUIRE process then can interrogate the remote location to locate the transfer. If the transfer is pending or active, it is listed in a predetermined, and agreed upon, data set. If the transfer has completed, whether successful or unsuccessful, it can be logged in a history file. Both the request number and the time stamp for that transfer can be used to search for the transfer. The return code passed back by the INQUIRE step is determined by where the transfer was found and the actual status of the transfer.

Another useful task or activity is the TYPE=HISTORY activity retrieves history records based on parameters sent with the request. Once retrieved, those history records can be passed to some type of report generator that processes them and formats them into readable, user defined report output.

If a group of systems have been grouped together as a message group, then a local system can send requests to the group, which will allow all the group members to receive the request. Thus, a history retrieval request can be delivered to more than one remote system.

Tracing functionality can be implemented to show the exchange of data between members of a message group. Entries in an output dataset can be created to show the state of communications as well dumps of buffer content to facilitate problem determination related to signaling service activities.

As mentioned earlier, a default table of parameters can include configuration for parameter values that are relevant to signaling service communication. Examples of such parameters can include:

PLEXQ—specifies the name of the message group to which the server (XCOMXFER) is to connect. This parameter applies to the server.

STCPLEXQ—specifies the name of the message group to which the XCOMJOB batch utility is to connect. This parameter applies to XCOMJOB executions using TYPEs other than EXECUTE. There can be error checking code to determine if a server is already connected to the message group in order for the request to complete successfully.

Transfers can be scheduled either to the message group or directly to a server using the SNA or TCP/IP protocol. Transfers can be scheduled to a message group by using the STCPLEXQ parameter in the EXEC PARM of the XCOM-JOB utility program. Connections established to a message group do not use SNA or TCP/IP protocols, but rather a proprietary messaging protocol which uses SYSPLEX Signaling Services as its transport layer.

XCOMPLEX

XCOMPLEX is the module, as mentioned above, that provides interface services between XCOM communication requests and the signaling service. It is responsible for issuing the IXCxxxx macros on behalf of callers. XCOMPLEX acquires the control block PLXDSECT, which provides persistent storage for processing signaling service requests if one is not provided by the caller. The signaling service functions include IXCJOIN to connect to a message group, IXCLEAVE to disconnect from a message group, various IXCMSGO requests with differing attributes, and IXCMSGI that are issued from the Message User Exit and the Notify User Exit.

The Notify User Exit is configured to parse the replies from member servers in a message group and examine the CONTROL data area to determine which server is best able to service the incoming request to schedule a transfer. This exit is only driven and, therefore, the gathered replies are only valid, when in response to an internal command. For example, a USTAT command will be discussed that is issued to poll the message group member servers for an assessment of the activities currently being processed by each server. This exit will extract replies from each server and store them on the PLEXQ chain for the requestor. The unit of work which initiated the USTAT command is then POSTed.

The Message User Exit is configured to process incoming message requests that were either explicitly or generically directed to the local server. Information regarding the type and disposition of the incoming message can be encoded in the 32 bytes of CONTROL information defined by the signaling service protocol. The expected operation of the Message User Exit is such that if a local unit of work is expecting and waiting for a message reply, the data in the message is stored in the PLEXQ anchored in the appropriate NSA, and the unit of work is POSTed so that what it is processing may continue. Unsolicited messages are handled according to the type of request represented in the CONTROL fields; such handling can include allocating the necessary control blocks and storage which are to be used to process the request operation.

All signaling service operations, with the exception of IXCMSGI, can be initiated via the #PLEX macro. The #PLEX macro acts as the interface between the XCOMPLEX service module and all requesting programs as is described in further detail below.

Figure 5A:
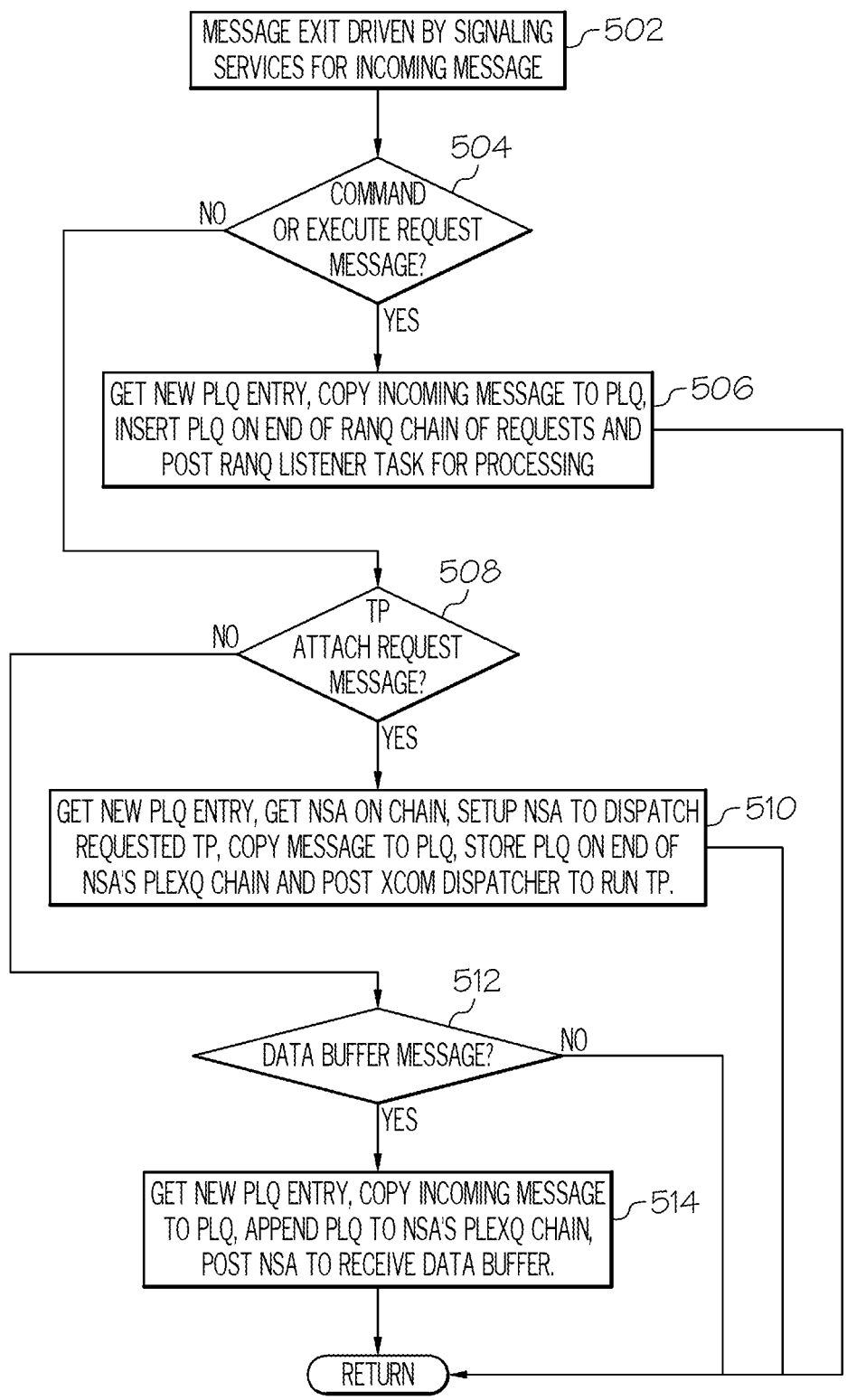
FIG. 5A depicts a flowchart of an example process for handling inbound signaling service messages in accordance with the principles of the present disclosure.

FIG. 5A depicts a flowchart of an example process for handling inbound signaling service messages in accordance with the principles of the present disclosure.

In step 502 an incoming signaling service message is received and that event triggers this message user exit routine. In step 504, the routine determines, from the 32 byte control block, whether the message is a command message or an execute routine message. If it is, then in step 506, the 32 bytes are considered a new PLEXQ entry and are added to the end of a chain of entries to be processed by RANQ. Also, the XCOMRANQ process is POSTed so that it knows the entry has been added to the chain.

If the message fails the test of step 504, then it is checked to see if it is an ATTACH request for a transaction program in step 508. If so, then in step 510 the 32 bytes are considered a PLEXQ entry and a network service anchor (NSA) to dispatch the request transaction program is obtained. The 32 bytes are copied to the PLEXQ chain of the NSA and the transaction program is dispatched.

A third possibility is that, in step 512, the message is determined to be a data buffer message. If so, then the 32 bytes is appended to the NSA's PLEXQ chain and the NSA is POSTed in order to receive the buffer.

FIG. 5B depicts a flowchart of an example process for handling inbound reply messages via a signaling service in accordance with the principles of the present disclosure. In step 520 an incoming signaling service reply message is received and that event triggers the Notify User Exit routine. In step 522, the routine determines if the reply message is because of a USTAT command. If so, then in step 524, the 32 bytes of the control block of each reply message is added to the PLEXQ chain of the requestor (i.e., NSA for that requestor). That NSA is also POSTed when all responses have been received.

Figure 5C:
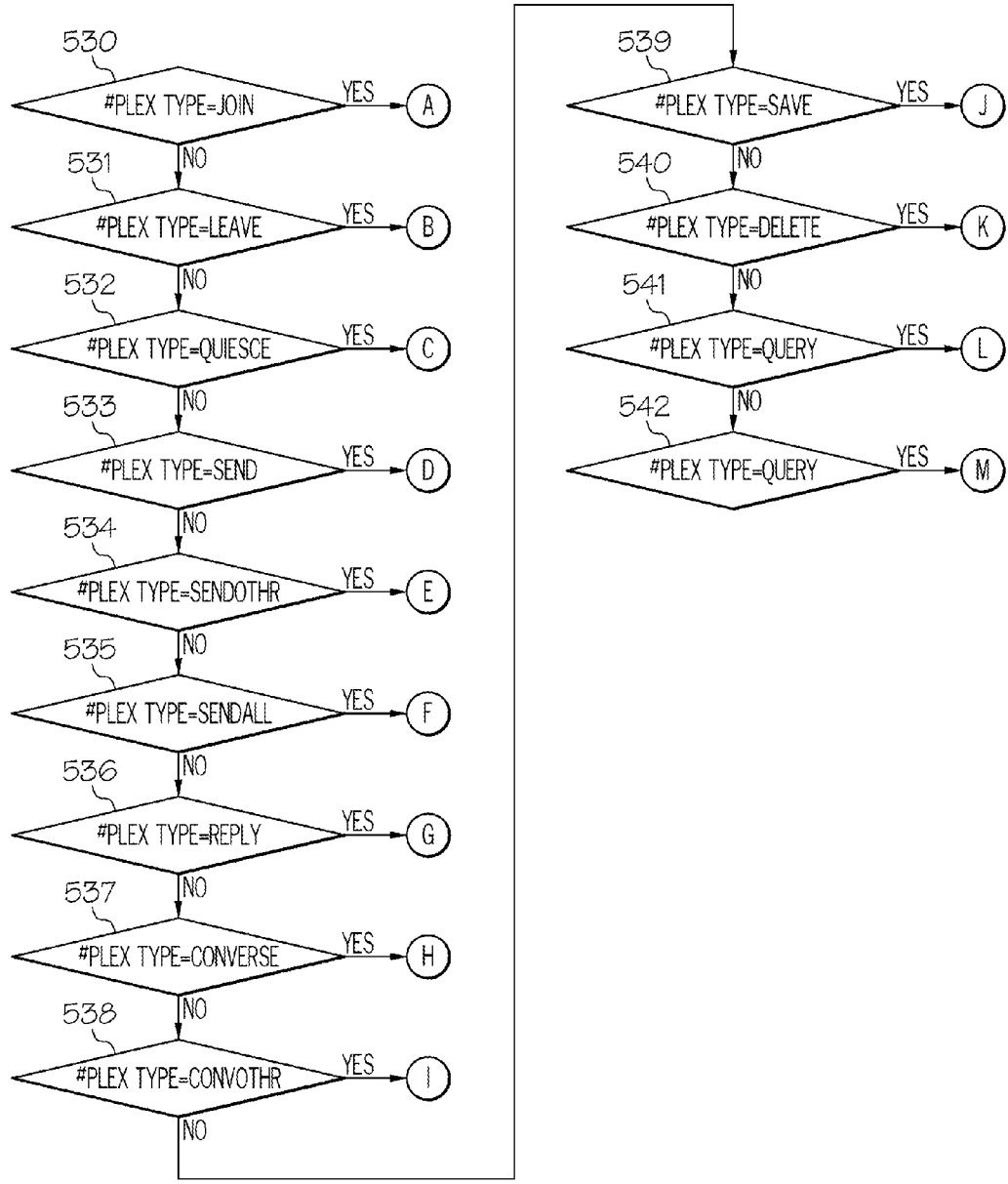
FIG. 5C.-5P depict a flowchart of an example process for providing an interface to signaling service messages in accordance with the principles of the present disclosure.

FIG. 5C. depicts a flowchart of an example process for providing an interface to signaling service messages in accordance with the principles of the present disclosure. When some other XCOM module invokes a #PLEX macro call, the code in XCOMPLEX will be performed to call the appropriate IXCxxxx macro provided by the operating system. The #PLEX calls and IXCxxxx macros relate to actions involving a message group. For example, a module will call #PLEX TYPE=zzzz where "zzzz" is a function such as JOIN, LEAVE, SEND, etc. The XCOMPLEX service module determines the parameters needed for that function and builds the statement to call the appropriate IXCxxxx macro using the parameters. These parameters can be determined by the default values that have been defined as well as values included in the #PLEX call received from a requestor.

FIG. 5C depicts the XCOMPLEX module determining whether the #PLEX call is a JOIN (step 530), LEAVE (step 531), QUIESCE (step 532), SEND (step 533), SEND TO OTHERS (step 534), SEND TO ALL (step 535), REPLY (step 536), CONVERSE (step 537), Converse WITH OTHERS (step 538), SAVE (step 539), DELETE (step 540), QUERY (step 541), and QUERY ALL (step 542). Based on this determination, an appropriate IXCxxxx macro call is built and initiated. The result is that a signaling service message is sent to the appropriate member(s) of a message group.

FIG. 5D illustrates that the necessary parameters for a JOIN are determined (step 546) and that these parameters are used to make an IXCJOIN macro call in step 547. Any responses or errors are handled in step 548. The parameters for performing a JOIN (and any of the other macro calls of FIG. 5C can be identified from the parameters included with the call (e.g. #PLEX TYPE=JOIN), the control block data structure, and the default options table for the XCOM server.

For example, in step 547, these parameters are then used to construct a properly formed IXCxxxx (e.g., IXCJOIN) macro call. As an example, the following macro call:
PLEX TYPE=JOIN Join PLEX messaging group
invokes the following IXCJOIN macro in module XCOM-PLEX

| | | |
|---|---|---|
| IXCJOIN GRPNAME=(R2), | GROUP name in PLEXQ table | + |
| MEMNAME=NO_MEMNAME, | Let XCF generate member name | + |
| ANSLEN=QUAA_LEN, | Answer area length | + |
| ANSAREA=QUAMEM1, | Answer area (returned QUAMEM) | + |
| MEMDATA=PLXMBRDT, | Member data | + |
| GRPEXIT=(R7), | Address of the GROUP EXIT | + |
| NOTIFYEXIT=(R8), | Address of the NOTIFY EXIT | + |
| MSGEXIT=(R9), | Address of the MESSAGE EXIT | + |
| CANREPLY=YES, | This is two-way communication | + |
| MEMASSOC=TASK, | Associate it with the RANQ task | + |
| LASTING=NO, | Not a persistent connection | + |
| USLEN==A(PLXSTATL), | User State Length | + |
| USTATE=PLXSTAT, | User State Info | + |
| RETCODE=PLXRC, | Return code | + |
| RSNCODE=PLXRSN, | Reason code | + |
| MF=(E, PLXJOIN, COMPLETE) | | |

FIG. 5E illustrates that the necessary parameters for a LEAVE are determined (step 543) and that these parameters are used to make an IXCLEAV macro call in step 544. Any responses or errors are handled in step 545.

FIG. 5F illustrates that the necessary parameters for a QUIESCE are determined (step 549) and that these parameters are used to make an IXCQUIES macro call in step 550. Any responses or errors are handled in step 551.

FIG. 5G illustrates that the necessary parameters for a SEND are determined (step 552) and that these parameters are used to make an IXCMSGO macro call in step 553. Any responses or errors are handled in step 554.

Figures 5H, 5I:
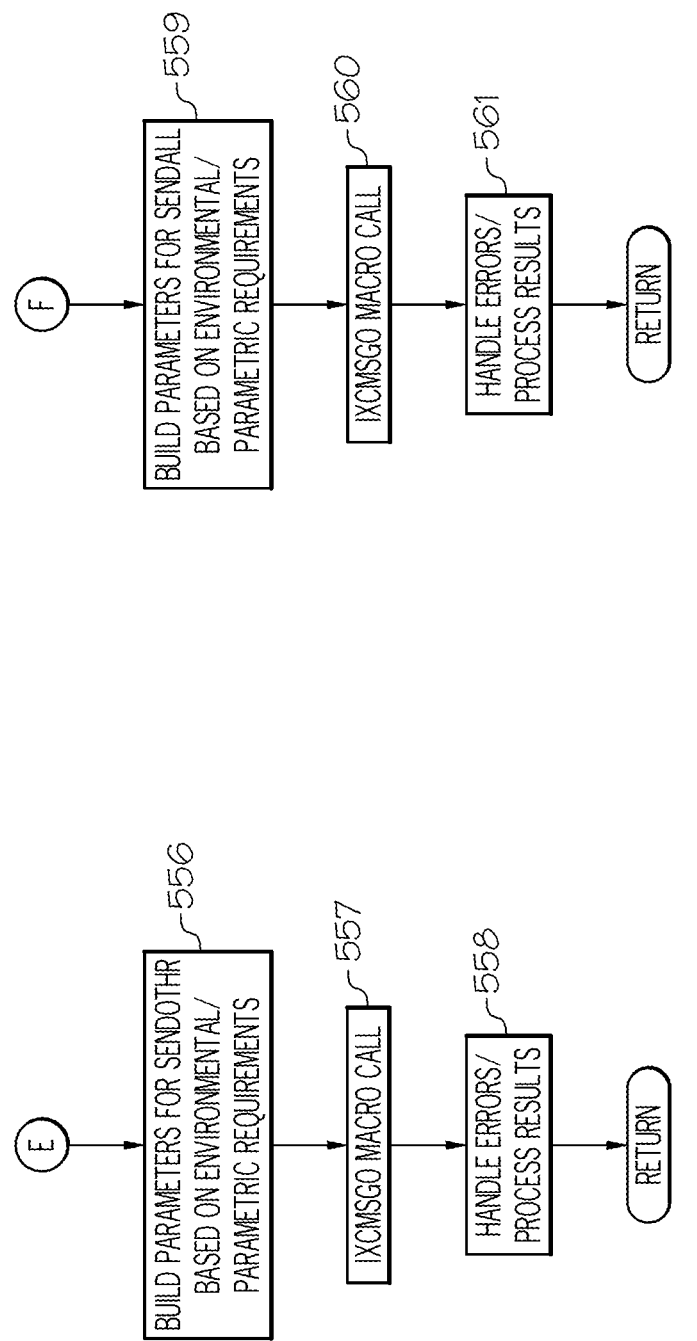
FIG. 5B depicts a flowchart of an example process for handling inbound reply messages via a signaling service in accordance with the principles of the present disclosure.

FIG. 5H illustrates that the necessary parameters for a SENDOTHR are determined (step 556) and that these parameters are used to make an IXCMSGO macro call in step 557. Any responses or errors are handled in step 558.

FIG. 5I illustrates that the necessary parameters for a SENDALL are determined (step 559) and that these parameters are used to make an IXCMSGO macro call in step 560. Any responses or errors are handled in step 561.

FIG. 5J illustrates that the necessary parameters for a REPLY are determined (step 562) and that these parameters are used to make an IXCMSGO macro call in step 563. Any responses or errors are handled in step 564.

FIG. 5K illustrates that the necessary parameters for a CONVERSE are determined (step 565) and that these parameters are used to make an IXCMSGO macro call in step 566. Any responses or errors are handled in step 567.

Figures 5L, 5M:
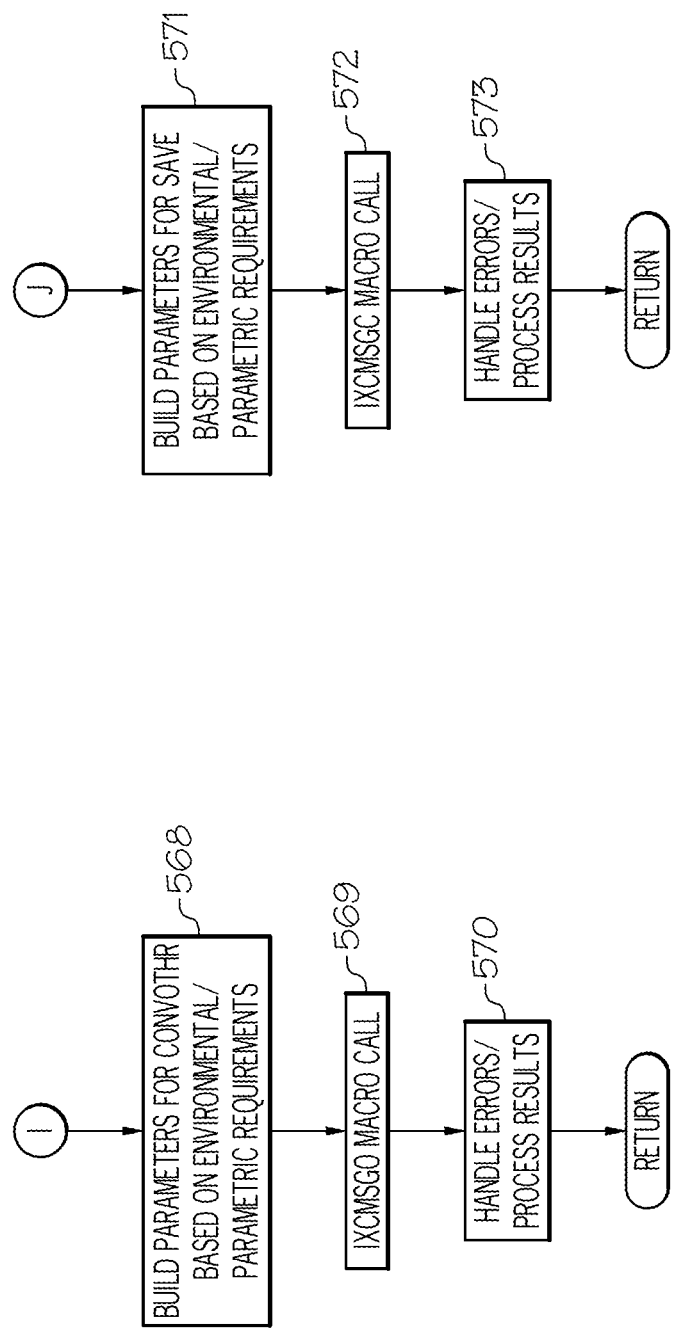

FIG. 5L illustrates that the necessary parameters for a CONVOTHR are determined (step 568) and that these parameters are used to make an IXCMSGO macro call in step 569. Any responses or errors are handled in step 570.

FIG. 5M illustrates that the necessary parameters for a SAVE are determined (step 571) and that these parameters are used to make an IXCMSGC macro call in step 572. Any responses or errors are handled in step 573.

FIG. 5N illustrates that the necessary parameters for a DELETE are determined (step 574) and that these parameters are used to make an IXCMSGC macro call in step 575. Any responses or errors are handled in step 576.

FIG. 5O illustrates that the necessary parameters for a QUERY are determined (step 577) and that these parameters are used to make an IXCQUERY macro call in step 578. Any responses or errors are handled in step 579.

Figure 5P:
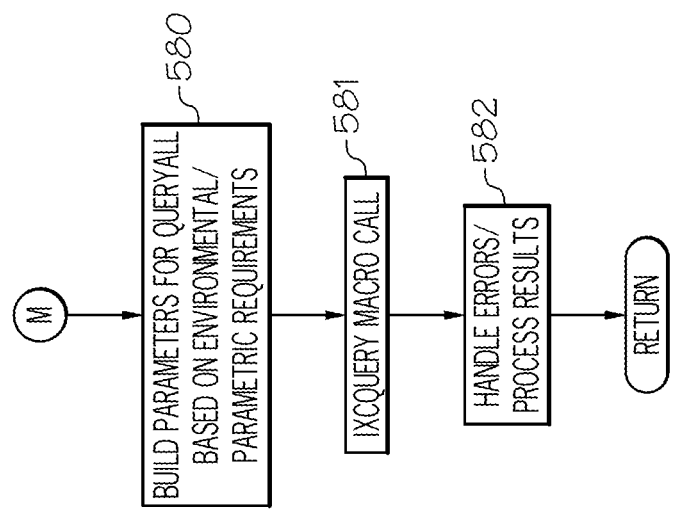

FIG. 5P illustrates that the necessary parameters for a QUERYALL are determined (step 580) and that these parameters are used to make an IXCQUERY macro call in step 581. Any responses or errors are handled in step 582.

XCOMRANQ

XCOMRANQ is a module that provides listener services for a server that is a member of a message group; it is attached as a subtask in an XCOM server address space but maintains its own NSA control block. XCOMRANQ can process the following commands:

USTAT: an internal command to gather statistics about the local server and REPLY (via the #PLEX macro) to the issuer of the command STAT: an operator command requesting a display of statistics from the local server.

XSHOW: an operator command requesting a display of locally-initiated transfers and their status.

XRSHOW: an operator command requesting a display of remotely-initiated transfers and their status.

WTOLOG: a command to write an accompanying buffer to a log dataset and to the SYSLOG.

TRACE: a command to write an accompanying buffer to a trace dataset.

XCOMRANQ can be ATTACHed as a subtask and allocated its own NSA. Initially it can check for entries in the PLEXQ chain via the #PLEXQ=DEQUEUE macro call. If entries exist on the PLEXQ chain, they will be extracted and processed. Once the #PLEXQ=DEQUEUE macro returns a QUEUE empty condition, the XCOMRANQ listener task enters a WAIT state until POSTed by the signaling service message user exit. When POSTed, the XCOMRANQ listener code will initiate the checking of the PLEXQ chain again.

Other modules interface with XCOMRANQ by placing entries in the PLEXQ chain via the #PLEXQ=ENQUEUE macro call. This data that is queued on the PLEXQ chain is mapped using the control block PLQDSECT. The PLQDSECT is mapped by the #PLEXQ TYPE=DSECT macro call.

Figure 6:
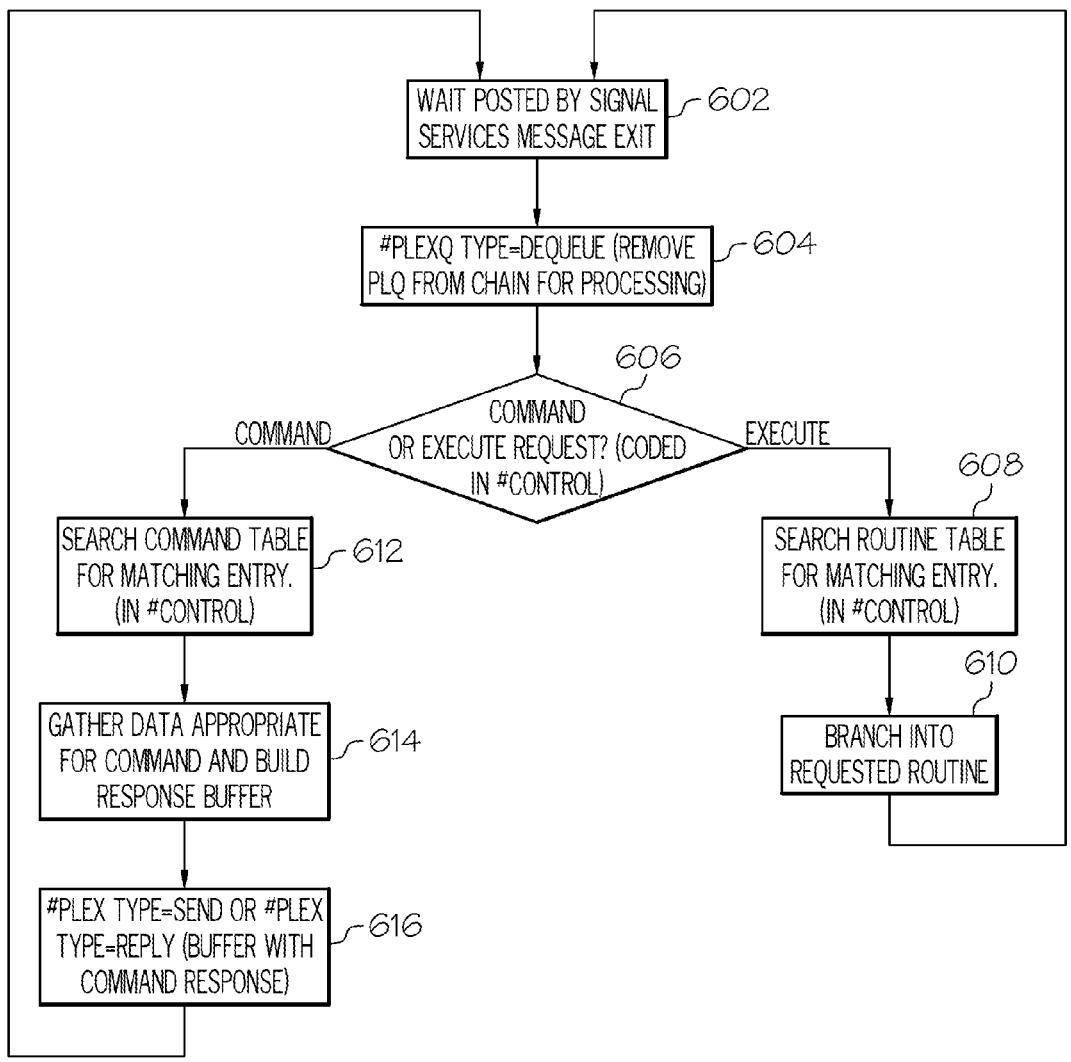
FIG. 6 depicts a flowchart of an example process for listening for external requests in accordance with the principles of the present disclosure.

FIG. 6 depicts a flowchart of an example process for listening for external requests in accordance with the principles of the present disclosure. In step 602, the listener process starts (e.g., exits a WAIT state) when POSTed by a signaling services message user exit indicating that a new entry has been added to the PLEXQ chain. It then, in step 604, issues a #PLEXQ macro call (e.g., #PLEXQ TYPE=DEQUEUE) to remove the PLEXQ entry for processing. In step 606, a determination is made whether the entry is a command or an execute request. This determination is made based on the information in the 32 bytes of CONTROL information encoded as described below with respect to the #CONTROL macro.

If the entry is an execute request, then in step 608 the routine specified in the CONTROL information is determined and, in step 610, control is branched to this routine.

If the entry is a command, then in step 612 the command specified in the CONTROL information is determined. In step 614, the parameters used to execute the command are determined, it is executed, and any response is built into a response buffer. In step 616, the response buffer is sent using either a #PLEX TYPE=SEND or a #PLEX TYPE=REPLY macro call.

XCOMHVTQ

XCOMHVTQ is a high-level interface module that converts standard XCOM communication macros (e.g. #SEND, #RECEIVE, etc.) to an analogous #PLEXQ code to initiate signaling service functions. Requests to RECEIVE data can check the PLEXQ chain for entries via the #PLEXQ TYPE=DEQUEUE macro. Each communication macro can invoke a unique communication command request that is processed within the module by a specific routine.

As an example, XCOMHVTQ can broadcast a USTAT command to all members of a message group to select a best target for a data transfer. XCOMHVTQ can then interpret the results received from the servers and update fields in the NSA and PLXDSECT so that subsequent communications occur with the appropriate, individual server that is selected.

Figure 7A:
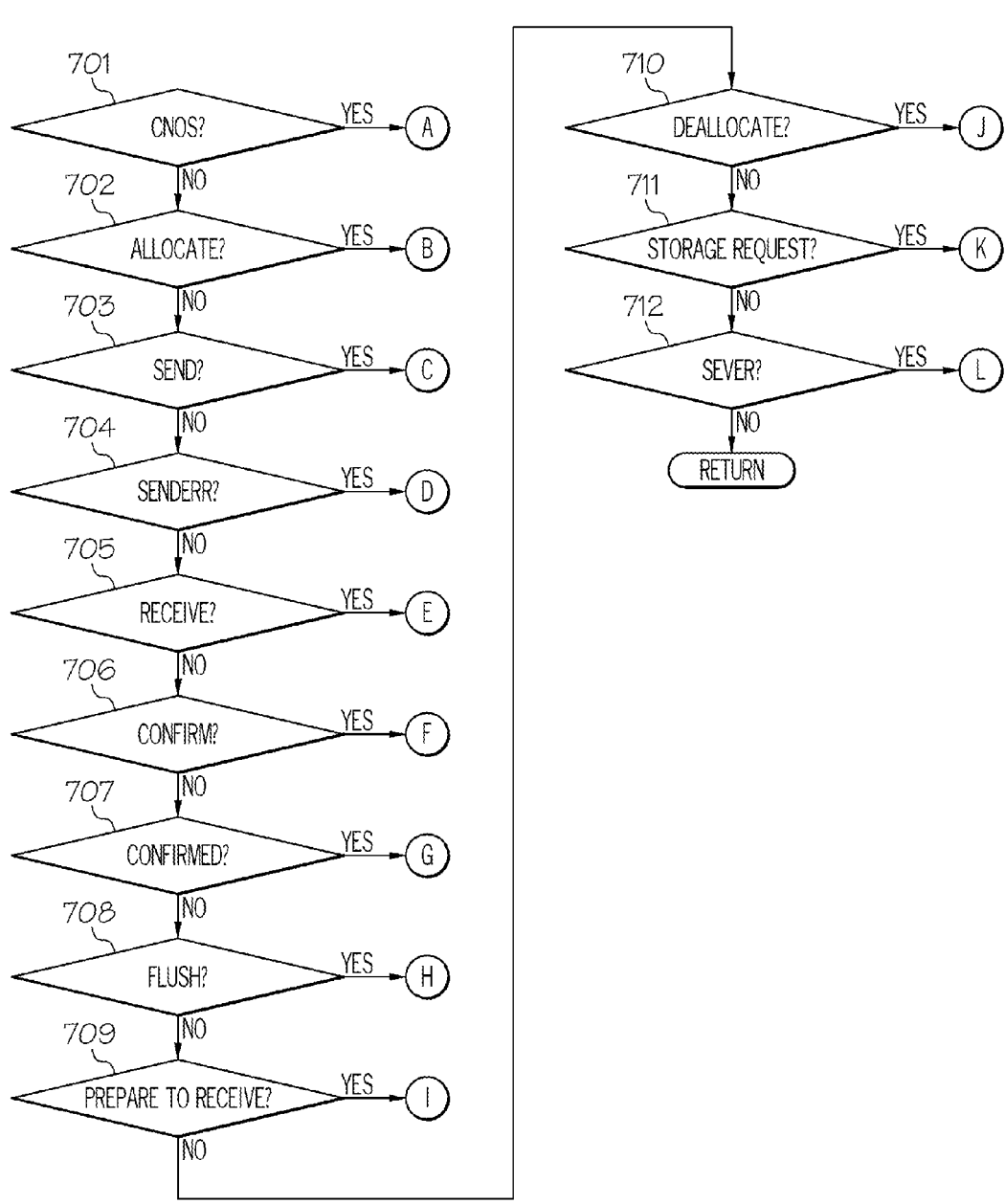

FIG. 7A depicts the XCOMHVTQ module determining whether the communication macro call is a CNOS (step 701), ALLOCATE (step 702), SEND (step 703), SEND ERROR (step 704), RECEIVE (step 705), CONFIRM (Step 706), CONFIRMED (step 707), FLUSH (step 708), PREPARE TO RECEIVE (step 709), DEALLOCATE (step 710) STORAGE REQUEST (Step 711) or SEVER (step 712).

Figure 7B:
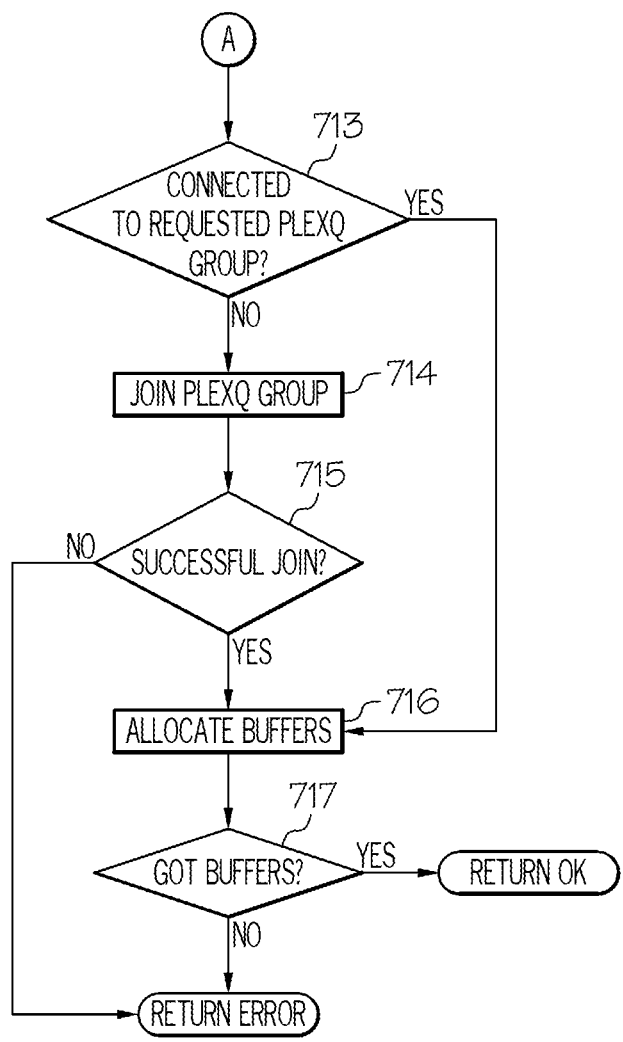

FIG. 7B relates to the macro call being CNOS, which means that a message group is to be joined. In step 713, it is determined whether that message group has already been joined. If so, then in step 716, buffers are allocated for any subsequent messages or replies. If not, then in step 714 a #PLEX TYPE=SEND macro call is made. Any buffers are allocated in step 716. Once the allocation of buffers is confirmed in step 717, control is returned to the process that initially made the communication macro call.

Figure 7D:
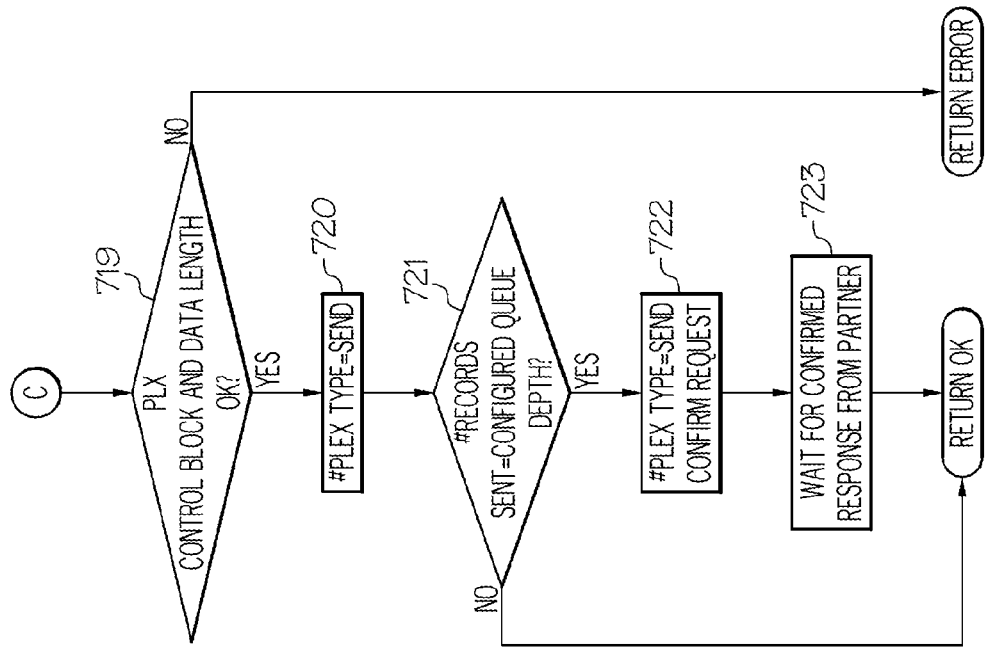
Figure 7C:
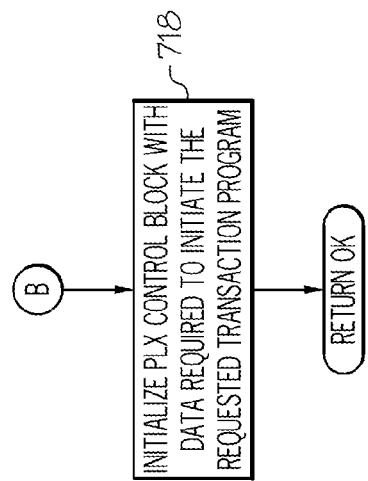

FIG. 7C relates to a macro call being ALLOCATE. In this case, in step 718, the control block is initialized with data required to initiate the requested transaction program. The transaction programs may, for example, perform the SCHEDULE, INQUIRE and HISTORY functions described herein.

FIG. 7D relates to a macro call being SEND. First, in step 719, a check is made to determine if the control block and the length of the data to be sent is correct. If so, then in step 720 a #PLEX TYPE=SEND macro call is made. If, in step 721, it is determined that the number of records that have been sent reaches a configured queue depth, then sending can be temporarily stopped. In step 722, a message is sent that asks the receiver for a confirmation before resuming sending of records. Once a confirmation is received, in step 723, processing can continue.

FIG. 7E relates to a macro call being SEND ERROR. When this macro is called, a flag is set in the control block, in step 724, that indicates an error has occurred. Then, in step 725, a message is sent informing the recipient that an error message is coming next. In step 726, the specific error message is encoded in the control block to be included in the next SEND.

Figure 7F:
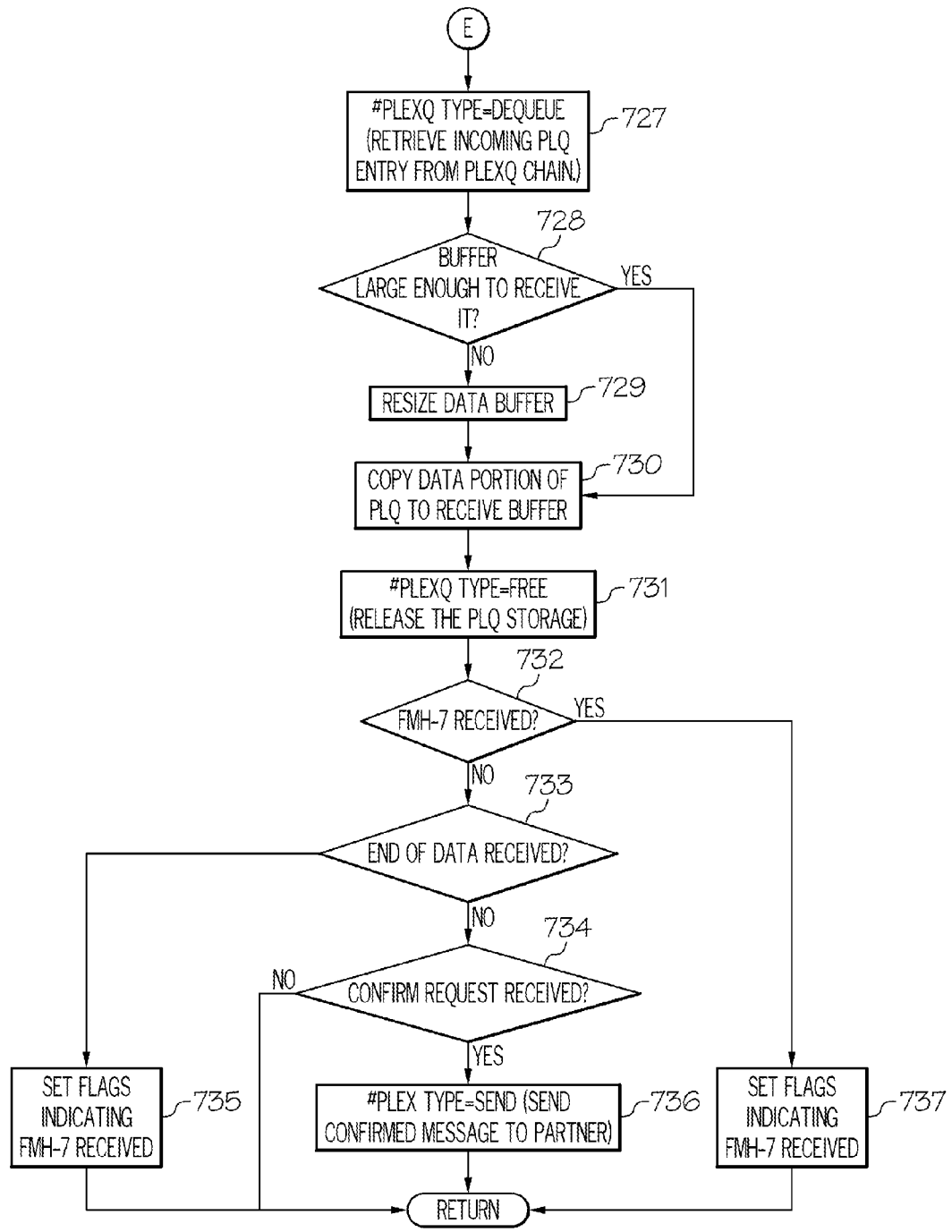

FIG. 7F relates to a macro call being RECEIVE. In response to this macro call, a #PLEXQ TYPE=DEQUEUE call is made, in step 727, to retrieve the next sequential entry from the PLEXQ chain. Steps 728 and 729 ensure that a buffer exists to handle the entry so that it can be copied, in step 730, to that buffer. Once a copy exists in the buffer, another #PLEX call can be made in step 731 to release to memory used to store the entry in the PLEXQ chain.

In step 732, a check is made to determine if a SEND ERROR has occurred. If so, then in step 737 appropriate flags in the control block are set in anticipation of receiving further error information. If not, then a check is made in step 733 to determine if all expected data has been received. Once this occurs, then in step 735 an appropriate flag is set and the SEND/RECEIVE state is reset. If more data is expected, then in step 734 a check is made to determine if a request to confirm data has been received. If so, then a #PLEX macro call is made to send a CONFIRMED message to the sender.

FIG. 7G relates to a macro call being CONFIRM. This macro relates to techniques for effecting flow control and, in step 738, forces a CONFIRMED response to a communications partner. It informs the partner that they can continue sending data.

FIG. 7H relates to a macro call being CONFIRMED. In step 738, a check is made to determine if communications are in a CONFIRM state which means that the communications partner is waiting to send additional data. In step 740, a CONFIRMED #PLEXQ macro call is made to inform the partner that more data can be sent and, in step 741, appropriate flags in the control block are set to reflect the SEND/RECEIVE state.

FIG. 7I relates to the macro call being FLUSH. In this instance a message has been received and an entry dequeued and placed in a message buffer. In step 742, this message buffer is removed and control returns to the calling transactional program.

Figure 7K:
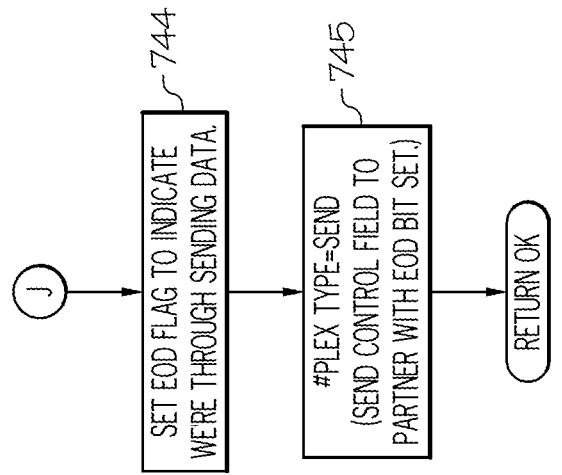
Figure 7J:
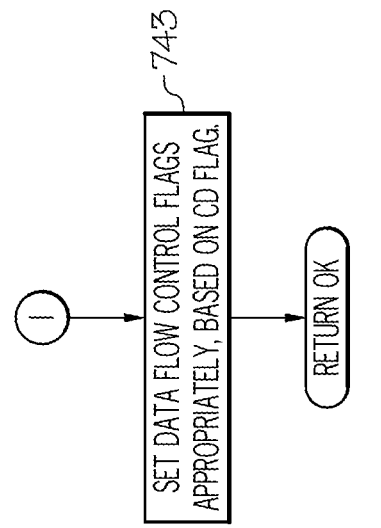

FIG. 7J relates to the macro call being PREPARE TO RECEIVE. In this instance, data control flags in the control block are set in step 743 that reflect the condition of being ready to receive a message.

FIG. 7K relates to the macro call being DEALLOCATE. In this instance, a flag is set in the control block in step 744 to indicate that all data has been sent. Once this occurs, a #PLEX TYPE=SEND macro can be called to send the control block encoded in the 32 bytes of control information. This encoded control block can be decoded to inform the recipient that all data has been sent. This model of communication is how the protocol of the present disclosure operates. A control block for the sender's process, task or job is configured with information that is to be communicated to a recipient. This control block is encoded in a predetermined manner into the 32 byte control data that is part of a signaling service message. Once the message is received by a recipient, the 32 byte control information can be decoded and the information from the encoded control block can be extracted.

Figure 7M:
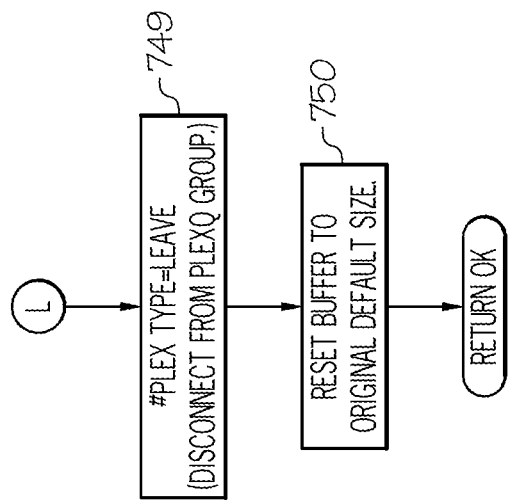
Figure 7L:
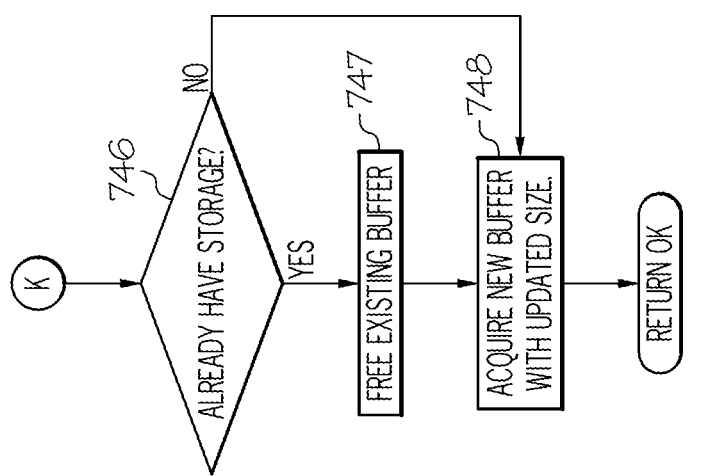

FIG. 7L relates to the macro call being GET STORAGE. This macro can be called at the beginning and end of any communication exchange. At the beginning it can allow a new buffer to be acquired and at the end it can free any buffers (e.g., acquire a buffer with size={some default}). So, in step 746, a check is made if buffer storage already exists. If so, then in step 747, the buffer is freed and a new buffer of appropriate size is acquired in step 748. If no current buffer exists, then control passes directly from step 746 to step 748 where a new buffer is acquired.

FIG. 7M relates to the macro call being SEVER. In this instance, communications are completed to the extent that membership in a message group can be terminated. Thus, in step 749, a #PLEXQ TYPE=LEAVE call is made and, in step 750, any message buffers are reset to an original size.

The XCOMHVTQ module also handles flow control. Invoking XCOMJOB with a HISTORY command can result in a lot of data being returned to the requestor. Thus, on the requestor's end, control of data flow can be managed to ensure the requestor can process the data and not be overloaded.

Figure 8A:
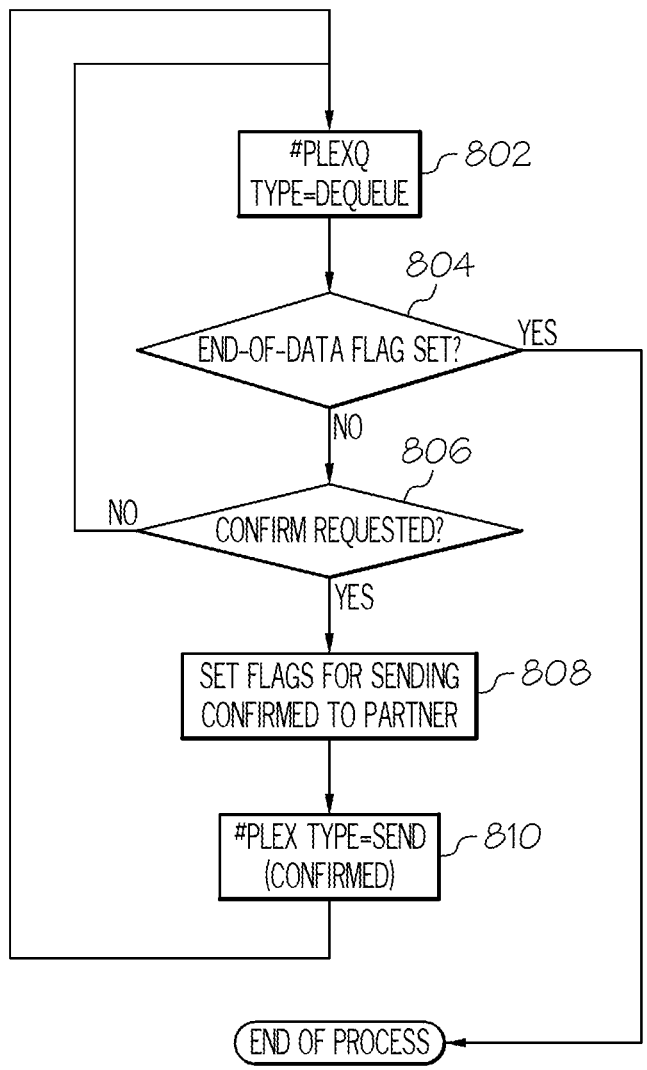
FIG. 8A and FIG. 8B depict a flowchart of an example process for pacing communication in accordance with the principles of the present disclosure.
Figure 8B:
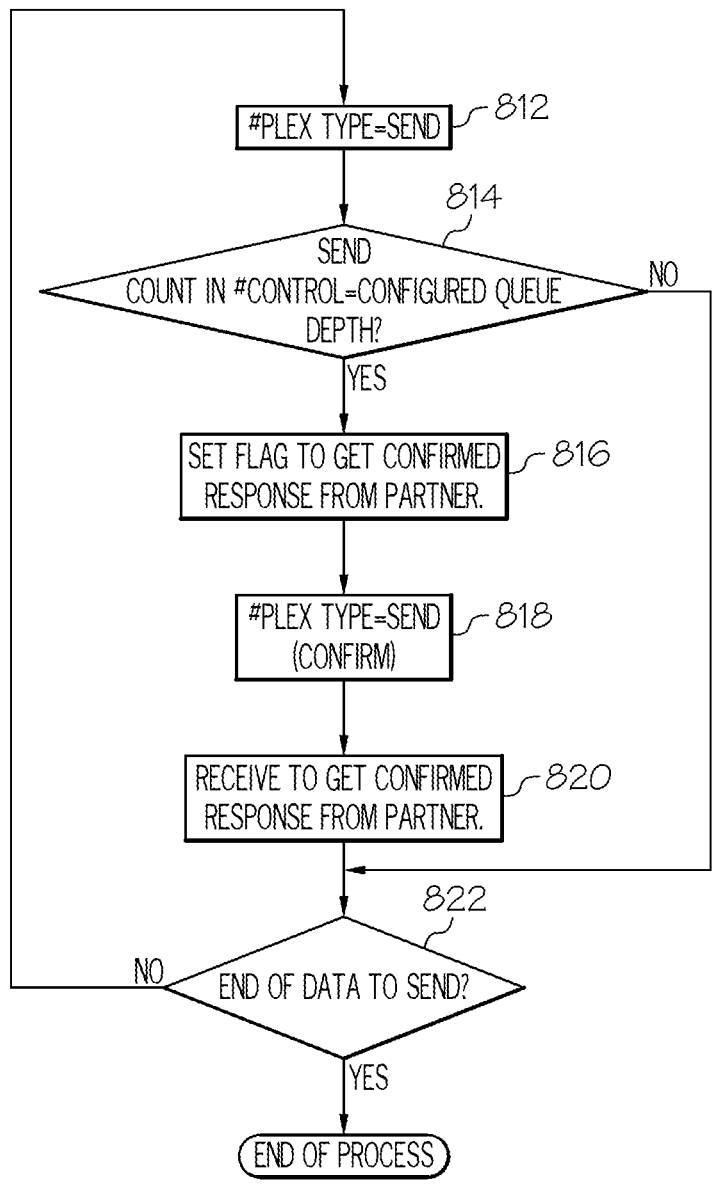

FIG. 8A and FIG. 8B depict a flowchart of an example process for pacing communication in accordance with the principles of the present disclosure. FIG. 8A is from the perspective of the receiving side and FIG. 8B is from the perspective of the sending side.

In step 802, a macro call is made to dequeue an entry from the PLEXQ chain. If, in step 804, it is determined that all data has been sent, then the process ends. If more data exists to be sent, then a check is made in step 806 to see if the CONFIRM flag has previously been set. If not, then continue dequeueing entries. However, if the receiver is in the CONFIRM state, then in step 808 a CONFIRMED message is constructed in the control block. In step 810, the CONFIRMED message is sent to the sender that informs them to resume sending data.

In step 812 of FIG. 8B, data is being sent via the #PLEX TYPE=SEND macro call. If the count of messages sent is less than a configured queue depth (as determined in step 814), then sending of data continues until an end-of-data condition is detected in step 822. The configured queue depth is set by the receiver in their control block and sent to the sender as encoded information in the 32 byte control information of a signaling service message.

Once the queue depth is reached, the sender sets a flag in step 816 indicating that it now will wait for a CONFIRMED message from the receiver before sending more data. This "waiting" state is sent to the receiver with a #PLEXQ macro call in step 818. On the sender's side a #PLEX TYPE=RECEIVE call will reveal when a CONFIRMED response is received in step 820. When this occurs, sending of data can resume until an end-of-data condition is reached in step 822.

CONTROL

Another macro (#CONTROL) can be used to map the CONTROL storage area that is inherent to signaling services. It is a 32 byte area that is used to pass information about an accompanying message so that the message does not necessarily have to be retrieved in order to be routed or processed. The 32 bytes related to a message can be encoded to contain information such as: the sender's name; the XCOM region type (e.g., XCOMJOB, worker server, etc.); Request type (e.g., Transaction program ATTACH, command, execute routine); REQUEST/RESPONSE flag; data status flag (e.g., more data remains, confirm request, confirm response, end of data); command to be processed; address of requestor's NSA; address of responder's NSA; address of routine to execute; requestor's CD flags; responder's CD flags; and a SEND counter. The fields and constants mapped in the #CONTROL macro are used to manage the communication protocol between the different XCOM address spaces that are in a message group.

PLEX

The #PLEX macro invokes a signaling service interface routine in the XCOMPLEX module to perform a desired function. In particular the following functions can be performed: JOIN a message group; LEAVE a message group; QUIESCE a message group; SEND a message to one member of the message group; SENDOTHR a message to other members of the message group; SENDALL a message to all member of the message group; REPLY to a specific message; CONVERSE to send a message to one member and get a reply; CONVOTHR to send a message to other members and get replies; SAVE a message; DELETE a message; and QUERY to ask for info about a member. The #PLEXQ macro constructs the parameters and prepares the fields required to perform a function in the XCOMPLEX service module.

PLEXQ

The #PLEXQ macro acquires, frees, enqueues, and dequeues entries that comprise the PLEXQ chain. Each PLEXQ entry represents a portion of work to be processed by one of the XCOM routines coded to process them. Entries in the XCOMRANQ (global within an XCOM address space) PLEXQ chain are removed and processed by a single task but could have been added to the chain by a number of different tasks (e.g., user written message exit routines running in parallel). Messages specific to a conversation being processed by an active transaction program are placed on the "private" PLEXQ chain unique to the NSA with which the transaction program is associated. The macro can allocate a variable size buffer to accommodate the amount of data received in an entry. The TYPE of #PLEXQ call can include ALLOC (acquire storage for a PLEXQ entry); FREE (release a FLEXQ entry storage); QUEUE (add a PLEXQ entry to the PLEXQ chain); and DEQUEUE (unchain and address the next PLEXQ entry in the chain). Chain entries can be identified, or referenced, by their data length, an address of the entry, and an anchor address where chain is located.

USTAT Process

As mentioned above, potential worker servers in a message group can be polled to determine their current utilization load. In making this determination, operational parameters on each of the worker servers can be evaluated. For example, when a data transport server is initialized, it can have a parameter set that indicates how many locally-initiated data transfer requests it desires to handle concurrently, and it can have a parameter set that indicates how many total data transfer requests it desires to handle concurrently. Thus, the number of data transfer requests currently being handled by a server can be compared against these parameters to determine a measure of the utilization workload specific to the parameter setting of that server.

Figure 9:
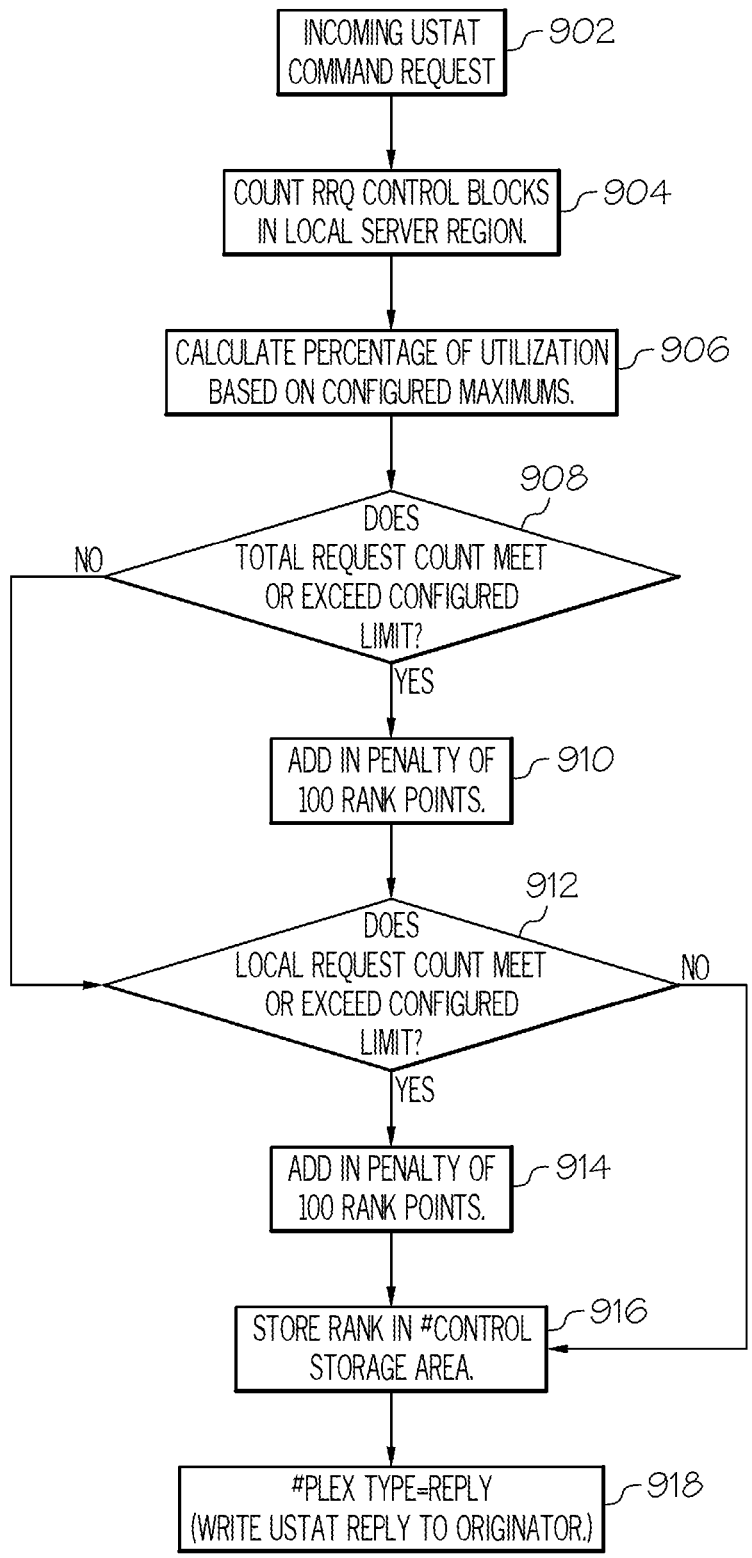
FIG. 9 depicts a flowchart of an example process for determining utilization workload in accordance with the principles of the present disclosure.

FIG. 9 depicts a flowchart of an example process for determining utilization workload in accordance with the principles of the present disclosure. In step 902, an incoming USTAT command is detected at a server. In response, that server counts, in step 904, the number of transfer requests it is currently handling. By examining the control blocks for each transfer request, the server can determine the number of requests as well as whether they were local initiated or remotely initiated.

In step 906, the count of transfer requests is compared to the configured parameter for the maximum number of concurrent requests. This comparison provides a percentage value based on the count and the allowed maximum (e.g. 70% utilization provides a score of "70"). If the score from step 906 equals or exceeds 100 as determined in step 908, then in step 910 a penalty of 100 points is added to that score to arrive at an intermediate score.

In step 912, a comparison is made between the number of locally-initiated transfer requests and the configured maximum parameter value for these types of requests. If the number of local request equals or exceeds the configured parameter, then in step 914, 100 penalty points are added to the initial score from step 906 or the intermediate score from step 910 to arrive at a final score. In step 914, the server can then store this score in its control block and send an encoded signaling service message to the USTAT originator in step 918.

On the receiving end, the USTAT originator can receive all the replies from the different servers, dequeue them (as described in the discussion of XCOMRANQ), and determine which of the servers has the lowest score. This server, then, can be selected for scheduling of the data transfer request.

Figure 10:
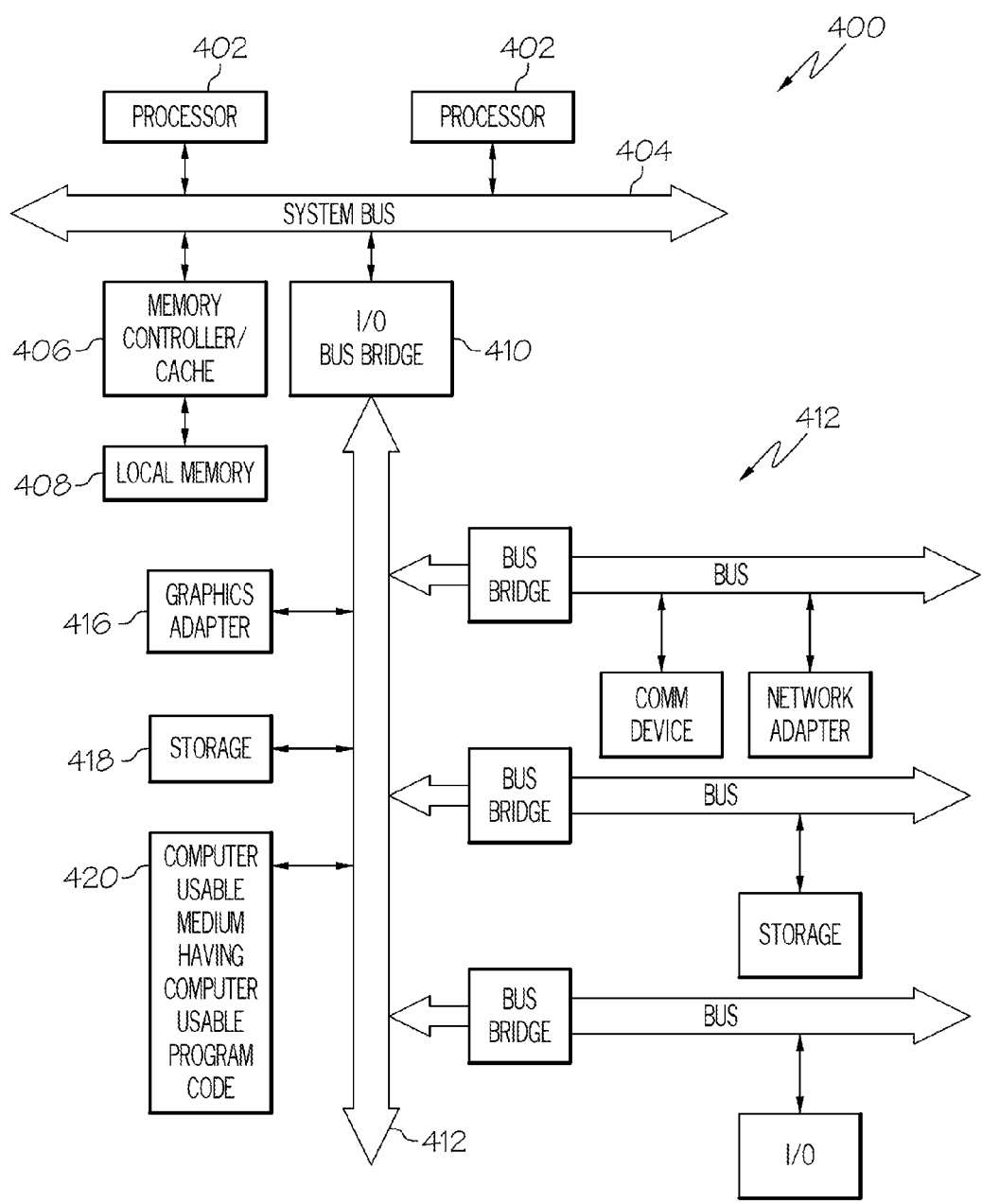
FIG. 10 illustrates a block diagram of a data processing system in accordance with the present disclosure.

Referring to FIG. 10, a block diagram of a data processing system is depicted in accordance with the present disclosure. A data processing system 400, such as may be utilized to implement the hardware platform 108 or aspects thereof, e.g., as set out in greater detail in FIG. 4-FIG. 9, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspects of any of the methods, computer program products and/or system components illustrated in FIG. 4-FIG. 9.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method for processing a request from a sending computer that is a co-member of a message group of a sysplex coupled together using a signaling service, the method comprising:

determining, by a receiving computer that is a co-member of the message group of the sysplex, that a signaling service message has been received from the sending computer that is a co-member of the message group of the sysplex, wherein the signaling service message relates to a data transfer between the sending computer and the receiving computer that are each a respective co-member of the message group of the sysplex; the message group of the sysplex comprises members defined to a cross-system coupling facility, wherein the cross-system coupling facility provides the signaling service;

the signaling service message is received over a first communications channel defined by the signaling service; and the data transfer relates to an exchange of one or more files between the sending and receiving computers that are each a respective co-member of the message group of the sysplex using a second communications channel other than the first communications channel defined by the signaling service;

decoding, by the receiving computer that is a co-member of the message group of the sysplex, the signaling service message to determine contents of the signaling service message related to the data transfer; and performing, by the receiving computer that is a co-member of the message group of the sysplex, an action related to the data transfer based on the contents of the signaling service message;

wherein:

the sending computer that is a co-member of the message group of the sysplex comprises a first data transfer module; and the receiving computer that is a co-member of the message group of the sysplex comprises a second data transfer module, wherein the data transfer modules communicate using the signaling service of the sysplex, wherein:

the first data transfer module comprises a first control block data structure local to the sending computer that is a co-member of the message group of the sysplex; and the second data transfer module comprises a second control block data structure local to the receiving computer that is a co-member of the message group of the sysplex.

2. The method of claim 1, wherein decoding comprises:

determining whether the contents of the signaling service message relates to either a) a command to perform or b) a separate routine to execute.

3. The method of claim 2, wherein when the contents relate to a command to perform, performing an action comprises:
   identifying data related to the command;
   performing the command to generate a result; and
   transmitting, to the sending computer that is a co-member of the message group of the sysplex, a response message based on the result.

4. The method of claim 2, wherein when the contents relate to a routine to execute, performing an action comprises:
   identifying the routine; and
   calling the routine for execution.

5. The method of claim 1, wherein the signaling service message comprises the first control block data structure.

6. The method of claim 5, wherein the contents relate to a command to perform and performing an action comprises:
   performing the command to generate a result; and
   transmitting, to the sending computer that is a co-member of the message group of the sysplex, a response message based on the result.

7. The method of claim 6, wherein the response message comprises the second control block data structure.

8. The method of claim 1, wherein the signaling service message relates to determining a utilization load of the receiving computer that is a co-member of the message group of the sysplex.

9. A system for processing a request from a sending computer that is a co-member of a message group of a sysplex coupled together using a signaling service, the system comprising:
   a processor and a memory coupled to the processor, the memory configured to store program code executable by the processor;
   the program code, when executed by the processor, configured to determine that a signaling service message has been received from the sending computer that is a co-member of the message group of the sysplex, wherein
   the signaling service message relates to a data transfer between the sending computer that is a co-member of the message group of the sysplex and the system;
   the message group of the sysplex comprises members defined to a cross-system coupling facility, wherein the cross-system coupling facility provides the signaling service;
   the signaling service message is received over a first communications channel defined by the signaling service; and
   the data transfer relates to an exchange of one or more files between the sending computer that is a co-member of the message group of the sysplex and the system using a second communications channel other than the first communications channel defined by the signaling service;
   the program code, when executed by the processor, configured to decode the signaling service message to determine contents of the signaling service message related to the data transfer; and the program code, when executed by the processor, configured to perform an action related to the data transfer based on the contents of the signaling service message;
   wherein:
   the sending computer that is a co-member of the message group of the sysplex comprises a first data transfer module; and
   the receiving computer that is a co-member of the message group of the sysplex comprises a second data transfer module, wherein the data transfer modules communicate using the signaling service of the sysplex, wherein:
   the first data transfer module comprises a first control block data structure local to the sending computer that is a co-member of the message group of the sysplex; and
   the second data transfer module comprises a second control block data structure local to the receiving computer that is a co-member of the message group of the sysplex.

10. The system of claim 9, wherein the program code to decode is further configured to:
    determine whether the contents of the signaling service message relates to either a) a command to perform or b) a separate routine to execute.

11. The system of claim 10, wherein when the contents relate to a command to perform, the program code to perform an action is further configured to:
    identify data related to the command;
    perform the command to generate a result; and
    transmit, to the sending computer that is a co-member of the message group of the sysplex, a response message based on the result.

12. The system of claim 10, wherein when the contents relate to a routine to execute, the program code to perform an action is further configured to:
    identify the routine; and
    call the routine for execution.

13. The system of claim 9, wherein:
    the sending computer that is a co-member of the message group of the sysplex comprises a first data transfer module; and
    the system comprises a second data transfer module, wherein the data transfer modules communicate using the signaling service of the sysplex.

14. The system of claim 13, wherein:
    the first data transfer module comprises a first control block data structure local to the sending computer that is a co-member of the message group of the sysplex; and
    the second data transfer module comprises a second control block data structure local to the system.

15. The system of claim 14, wherein the signaling service message comprises the first control block data structure.

16. The system of claim 15, wherein the contents relate to a command to perform and the program code to perform an action is further configured to:
    perform the command to generate a result; and
    transmit, to the sending computer that is a co-member of the message group of the sysplex, a response message based on the result.

17. The system of claim 16, wherein the response message comprises the second control block data structure.

18. The system of claim 9, wherein the signaling service message relates to determining a utilization load of the system.

19. A computer program product for processing a request, received at a receiving computer and sent by a sending computer that are each co-members of a message group of a sysplex coupled together using a signaling service, the computer program product comprising:
    a non-transitory computer readable storage medium having computer readable program code embodied therewith, the computer readable program code comprising:

computer readable program code configured to determine that a signaling service message has been received from the sending computer that is a co-member of the message group of the sysplex, wherein the signaling service message relates to a data transfer between the sending computer and the receiving computer that are each a respective co-member of the message group of the sysplex;

the message group of the sysplex comprises members defined to a cross-system coupling facility, wherein the cross-system coupling facility provides the signaling service;

the signaling service message is received over a first communications channel defined by the signaling service; and the data transfer relates to an exchange of one or more files between the sending and receiving computers that are each a respective co-member of the message group of the sysplex using a second communications channel other than the first communications channel defined by the signaling service;

computer readable program code configured to decode the signaling service message to determine contents of the signaling service message related to the data transfer; and computer readable program code configured to perform an action related to the data transfer based on the contents of the signaling service message wherein:

the sending computer that is a co-member of the message group of the sysplex comprises a first data transfer module; and the receiving computer that is a co-member of the message group of the sysplex comprises a second data transfer module, wherein the data transfer modules communicate using the signaling service of the sysplex, wherein:

the first data transfer module comprises a first control block data structure local to the sending computer that is a co-member of the message group of the sysplex; and the second data transfer module comprises a second control block data structure local to the receiving computer that is a co-member of the message group of the sysplex.

20. The computer program product of claim 19, comprising:

computer readable program code configured to determine whether the contents of the signaling service message relates to either a) a command to perform or b) a separate routine to execute.

21. The computer program product of claim 20, wherein when the contents relate to a command to perform, the computer readable program code further comprises:

computer readable program code configured to identify data related to the command;

computer readable program code configured to perform the command to generate a result; and computer readable program code configured to transmit, to the sending computer that is a co-member of the message group of the sysplex, a response message based on the result.

22. The computer program product of claim 20, wherein when the contents relate to a routine to execute, the computer readable program code further comprises:

computer readable program code configured to identify the routine; and computer readable program code configured to call the routine for execution.

23. The computer program product of claim 19, wherein:

the sending computer that is a co-member of the message group of the sysplex comprises a first data transfer module; and the receiving computer that is a co-member of the message group of the sysplex comprises a second data transfer module, wherein the data transfer modules communicate using the signaling service of the sysplex.

24. The computer program product of claim 23, wherein:

the first data transfer module comprises a first control block data structure local to the sending computer that is a co-member of the message group of the sysplex; and the second data transfer module comprises a second control block data structure local to the receiving computer that is a co-member of the message group of the sysplex.

25. The computer program product of claim 24, wherein the signaling service message comprises the first control block data structure.

26. The computer program product of claim 25, wherein the contents relate to a command to perform, and the computer readable program code further comprises:

computer readable program code configured to perform the command to generate a result; and computer readable program code configured to transmit, to the sending computer that is a co-member of the message group of the sysplex, a response message based on the result.

27. The computer program product of claim 26, wherein the response message comprises the second control block data structure.

28. The computer program product of claim 19, wherein the signaling service message relates to determining a utilization load of the receiving computer that is a co-member of the message group of the sysplex.

* * * * *